INVENTOR.
DONALD RICHMAN
BY Laurence B. Dodds
ATTORNEY

Aug. 19, 1958 D. RICHMAN 2,848,537

HIGHLY NOISE-IMMUNE SYNCHRONIZING SYSTEM

Filed Dec. 31, 1952 4 Sheets-Sheet 2

INVENTOR.
DONALD RICHMAN

BY Lawrence B. Dodds

ATTORNEY

HIGHLY NOISE-IMMUNE SYNCHRONIZING SYSTEM

INVENTOR.
DONALD RICHMAN
BY Laurence B. Dodds
ATTORNEY

HIGHLY NOISE-IMMUNE SYNCHRONIZING SYSTEM

Filed Dec. 31, 1952 4 Sheets-Sheet 4

INVENTOR.
DONALD RICHMAN
BY Laurence B. Dodds
ATTORNEY 2,848,537

HIGHLY NOISE-IMMUNE SYNCHRONIZING SYSTEM

Donald Richman, Flushing, N. Y., assignor to Hazeltine Research, Inc., Chicago, Ill., a corporation of Illinois Application December 31, 1952, Serial No. 328,917

20 Claims. (Cl. 178—69.5)

*General*

This invention relates to synchronizing systems for synchronizing the operation of signal generators and particularly to such systems for use in television receivers for maintaining apparatus for developing signals in such receivers in synchronism with selected synchronizing components of an intercepted television signal. Though the invention is subject to a wide variety of applications, it has particular utility in scanning systems in such receivers. It also has utility in a color-television receiver, particularly in the color-signal deriving system thereof, for synchronizing the operation of a generator for developing a local color wave signal with that of a corresponding generator at a color-television transmitter. Therefore, the synchronizing system will be described in these environments.

In order to obtain a satisfactory image on the screen of the cathode-ray image-reproducing tube at a television receiver, it is important that accurate synchronism be maintained at all times and under the most extreme conditions between the scanning process at the receiver and the synchronizing components of the received television signals from which are derived signals to reproduce the image. To accomplish such a result, at one time the scanning systems of television receivers were constructed so that each synchronizing pulse was applied directly to a line-frequency oscillator for generating scanning waves, thereby causing each pulse to initiate or trigger one cycle of oscillation of the scanning wave. Such systems are conventionally designated triggered-type synchronizing systems and operate satisfactorily if the signal-to-noise ratio is high. However, in practice noise disturbances and other unwanted signals are usually effective to trigger the oscillator developing the scanning waves, thereby tending to destroy the synchronization and thus distort the reproduced image.

To overcome the deleterious effects of such noise disturbances, more recently scanning systems have been constructed so as to have some immunity to such disturbances. Generally, such systems include circuits for integrating a number of synchronizing pulses to provide an averaged control effect for the scanning system rather than directly utilizing each synchronizing pulse to control the system. One type of such system has, for example, taken the form of a phase detector, a suitable low-pass filter network in the form of an integration circuit, and a direct-current amplifier arranged to supply its output potential to a line-frequency oscillator. Synchronizing pulses from a received television signal and an output signal of the line-frequency oscillator are applied to the phase detector and variations in the output potential of the phase detector, caused bp phase changes between the synchronizing pulses and the signal generated in the line-frequency oscillator as supplied to the detector, impress a varying amplitude control potential on the direct-current amplifier. The latter potential is translated through the amplifier to control the frequency of the line-frequency oscillator. The variation in amplitude of the control potential is of relatively low frequency with respect to the repetition rate of the line-synchronizing pulses due to the low-frequency response characteristic of the integration circuit and, therefore, such a system may be said to have a low-frequency response characteristic. In effect, in the latter synchronizing system random noise pulses or other undesired signals are averaged out over a substantial number of cycles. This type of synchronizing system is conventionally known as an automatic-frequency-control (AFC) system though more accurately it is an automatic-phase-control (APC) system and will be referred to as such hereinafter. Though such systems are relatively immune to noise and other undesired signals they tend to have other deficiencies. Scanning systems utilizing such synchronizing systems have limited pull-in ranges and a high degree of electrical inertia. As a result, if the pull-in range is not exceeded, such systems usually require the period of many synchronizing pulses to effect synchronization of the scanning process with the synchronizing components. For frequency differences in the vicinity of the extremes of the pull-in range, the pull-in time may be excessive.

In summary, a scanning system employing triggered-type synchronization has the desired characteristics of being capable of being quickly synchronized and of having a wide pull-in range while having the undesired characteristic of being highly responsive to noise and other undesired signals and thereby of readily losing synchronization. On the other hand, a scanning system including an automatic-phase-control system, though relatively immune to random noise pulses, tends to lose synchronization in the absence of any large number of synchronizing pulses and requires a considerable time to be resynchronized and may have a relatively narrow pull-in range. It is desirable that a scanning system have the flexibility and pull-in range of a system including triggered-type synchronization when the scanning system is out of synchronization and have the stability of operation of a system including automatic-phase control when the scanning system is in synchronization. The present invention is directed to an improved synchronizing system having such desired characteristics and other characteristics to be considered more fully hereinafter.

Synchronizing problems similar to those just considered are also prevalent in some forms of color-television systems. In a color-television system of one type, it is conventional at the transmitter to modulate a subcarrier wave signal at different phase points by signals individually representative of the primary colors of an image. At a receiver utilizing such subcarrier wave signal, it is conventional to include a generator for developing a color wave signal which corresponds to the subcarrier wave signal. Reference phases of the developed signal and the subcarrier wave signal desirably have a predetermined phase relation and these signals heterodyne in the receiver to derive the modulation components from the subcarrier wave signal. In order that such predetermined phase relation be maintained and that the proper components be derived from the subcarrier wave signal, the operation of the generator at the receiver is preferably synchronized with that of the corresponding generator at the transmitter. This synchronization is conventionally effected by including in the transmitted signal a short burst or pulse of approximately 10 cycles of the unmodulated subcarrier wave signal having a predetermined phase. These few cycles are derived at the receiver and a phase thereof compared with a reference phase of the locally developed signal to develop a control effect representative of the phase relation of these signals. Such phase comparison may be effected in a conventional manner, utilizing a conventional type of phase detector, and the operation of the generator at the receiver may be maintained in synchronism with that of the corresponding generator at the transmitter by means of a conventional automatic-phase-control system. For the reasons considered above, problems similar to those previously discussed herein are also encountered when synchronizing the operation of these generators. It is desirable to utilize an APC system to maintain the generator at the receiver in synchronism with the one at the transmitter and it is desirable to utilize a system having some of the characteristics of a triggered-type synchronizing system when the generator at the receiver is out of synchronism. Consequently, the present invention is also directed to an improved synchronizing system having utility in a color-television receiver to control the operation of a color wave-signal generator therein.

It is, therefore, an object of the present invention to provide a new and improved synchronizing system which does not have the above-mentioned deficiencies of prior synchronizing systems.

It is a further object of the present invention to provide a new and improved synchronizing system which has one mode of operation to effect synchronization when the units being synchronized are substantially in synchronism and another mode of operation when they are not in synchronism.

It is a still further object of the present invention to provide a new and improved synchronizing system which is relatively immune to random noise signals.

It is still an additional object of the present invention to provide a new and improved synchronizing system which has a rapid pull-in characteristic when the units being synchronized are out of synchronization and stability when they are substantially in synchronization.

In accordance with the present invention, a highly noise-immune synchronizing system comprises means for supplying a synchronizing signal liable to accompanying noise signals and a generator for generating oscillations desirably in synchronism with said synchronizing signal but which may be undesirably out of synchronism. The system further includes synchronizing means for normally maintaining said oscillations in synchronism and at a desired phase relation with said synchronizing signal including means for confining the response of said synchronizing means to noise signals during in-synchronism operation to a narrow pass band of frequencies, whereby its pull-in performance from out-of-synchronism operation is unsatisfactory. The system further includes an auxiliary control system including means responsive jointly to said oscillations and said synchronizing signal and substantially unresponsive to noise signals for producing different control effects for out-of-synchronism operation and in-synchronism operation. The system also includes circuit means for utilizing said control effects for modifying the out-of-synchronism operation of said synchronizing means in such a way that the pull-in performance from out-of-synchronism operation is substantially improved.

Hereinafter the expression "improvement in pull-in performance" will be used to mean either a shortening of pull-in time or an enlargement of pull-in range, or both together. Likewise, the expression "unsatisfactory pull-in performance" will be used to indicate either an excessive pull-in time or too short a pull-in range, or both together.

For a better understanding of the present invention, together with other and further objects thereof, reference is had to the following description taken in connection with the accompanying drawings, and its scope will be pointed out in the appended claims.

Figure 1:
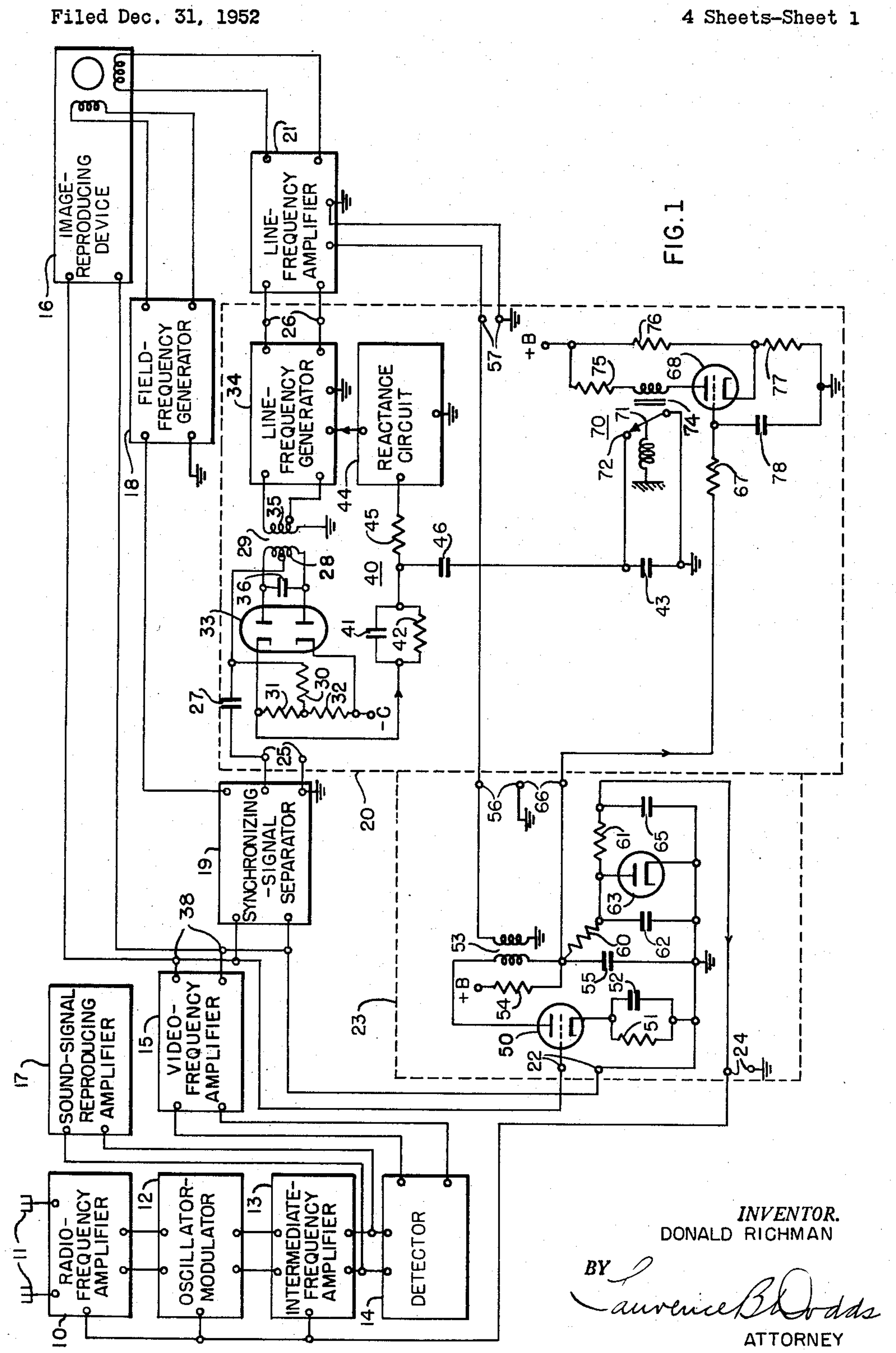
Fig. 1 is a circuit diagram, partly schematic, of a television receiver utilizing a synchronizing system in accordance with the present invention.

*General description of television receiver of Fig. 1*

Referring now more particularly to Fig. 1 of the drawings, the monochrome type of television receiver there represented includes a radio-frequency amplifier 10, of one or more stages, having an antenna system 11, 11 coupled to an input circuit thereof. There are coupled to the output circuit of the unit 10, in cascade, in the order named, an oscillator-modulator 12, an intermediate-frequency amplifier 13 of one or more stages, a detector 14, a direct-current video-frequency amplifier 15 of one or more stages, having a pair of output terminals 38, 38, and an image-reproducing device 16 of the cathode-ray tube type. The device 16 includes the usual line-frequency and field-frequency scanning coils for deflecting a cathode-ray electron beam developed in the device 16 in two directions normal to each other. Connected to the output terminals of the intermediate-frequency amplifier 13 is a conventional sound-signal reproducing unit 17 which may comprise an intermediate-frequency amplifier, a frequency detector, an audio-frequency amplifier, and a sound-reproducing device.

The output circuit of the video-frequency amplifier 15 is coupled to the field-scanning coil in the device 16 through a synchronizing-signal separator 19 and a field-frequency generator 18. The same output circuit of the amplifier 15 is coupled through the synchronizing-signal separator 19, a highly noise-immune synchronizing system 20 having a pair of input terminals 25, 25 and a pair of output terminals 26, 26 and which is constructed in accordance with the present invention and will be described more fully hereinafter, and through a line-frequency amplifier 21 to the line-frequency scanning coil in the device 16. The output circuit of the video-frequency amplifier 15 is also connected through a pair of terminals 22, 22 to an auxiliary control system 23 which is part of the synchronizing system 20. The auxiliary control system 23 will be considered more fully hereinafter, and is of a type more completely described and claimed in applicant's copending application Serial No. 225,388, filed May 9, 1951, entitled "Control Apparatus for Television Receivers." Output terminals 24, 24 of the control apparatus 23 are connected to input circuits of one or more of the stages 10, 12, and 13 to supply an automatic-gain-control or AGC effect to these stages.

The antenna system 11, 11 and the units 10, 12–19, inclusive, and 21 may be of conventional construction and operation so that a detailed description and explanation of the operation thereof are considered unnecessary herein.

*General operation of receiver of Fig. 1*

Considering briefly, however, the general operation of the above-described receiver as a whole, and assuming that the units 20 and 23 are portions of a conventional system for developing a line-frequency scanning signal, television signals intercepted by the antenna system 11, 11 are selected and amplified in the radio-frequency amplifier 10 and applied to the oscillator-modulator 12 wherein they are converted to intermediate-frequency signals. The latter signals are, in turn, selectively amplified in the intermediate-frequency amplifier 13 and the modulation components thereof are derived in the detector 14. These derived components, including synchronizing components as well as picture signals, are amplified in the video-frequency amplifier 15 and applied to an intensity control circuit for the electron beam in the image-reproducing device 16. A signal including both line-frequency and field-frequency synchronizing pulses is applied from the unit 15 to the synchronizing-signal separator 19 wherein the two types of synchronizing pulses are separated from each other and individual ones thereof supplied to the generator 18 and the synchronizing system 20. Saw-tooth current waves are generated in the units 18 and 20 and applied, respectively, to the field-scanning coil and through the amplifier 21 to the line-scanning coil in the image-reproducing device 16 to produce conventional scanning fields. These scanning fields are effective to deflect a cathode-ray beam developed in the device 16 in two directions normal to each other to trace a rectilinear scanning pattern on the screen of the cathode-ray tube and, in cooperation with the intensity control of the cathode-ray beam by the video-frequency signals applied from the amplifier 15, to reconstruct the televised image.

A control voltage which is derived in the unit 23, in a manner to be explained more fully hereinafter, is applied as an automatic-gain-control bias to the gain-control circuits of units 10, 12, and 13 to maintain the signal input to the detector 14 within a relatively narrow range for a wide range of received signal intensities. The audio-frequency modulation components of the received signal are derived in a conventional manner by the sound-signal detector in the unit 17 and amplified and reproduced in this unit.

*Description of synchronizing system of Fig. 1*

Considering now more particularly the synchronizing system 20, including the auxiliary control system 23, this system comprises a circuit for supplying synchronizing signals liable to accompanying noise signals, specifically, the circuit including the terminals 25, 25 coupled to the output circuit of the synchronizing-signal separator 19. This circuit also includes a condenser 27 coupled to the latter terminals and to a center tap of a winding 28 of a transformer 29. The condenser 27 is also coupled through a resistor 30 to the junction of a pair of resistors 31 and 32 which are coupled in series between the cathodes of a duo-diode tube 33.

The synchronizing system 20 also comprises a generator, specifically, a conventional line-frequency generator 34, for generating oscillations desirably in synchronism with said synchronizing signals but which may be undesirably out-of-synchronism. The generator 34 has one output circuit coupled through the pair of terminals 26, 26 to the line-frequency amplifier 21 and another output circuit coupled through a primary winding 35 of the transformer 29 to the secondary winding 28 of this transformer.

The synchronizing system also comprises a synchronizing circuit in the form of an automatic-phase circuit including signal-heterodyning apparatus responsive jointly to the synchronizing components and the signal generated in the generator 34 for normally maintaining said oscillations in-synchronism and at a desired phase relation with said synchronizing signal including means for confining the response of said synchronizing means to noise signals during in-synchronism operation to a narrow pass band of frequencies, whereby its pull-in performance from out-of-synchronism operation is unsatisfactory. More specifically, the synchronizing circuit comprises a conventional phase detector circuit including the tube 33 having the anodes thereof coupled to the terminals of a parallel-tuned circuit resonant at line frequency and including a condenser 36 and the winding 28. One terminal of the series-connected resistors 31, 32 coupled to the cathodes of the tube 33 is connected to a source of bias potential −C while the other terminal of these resistors is connected to an integrating circuit 40. The synchronizing circuit also comprises the integrating circuit 40 including parallel-connected condenser 41 and resistor 42 coupled in series with condensers 46 and 43 between the previously mentioned other terminal of the resistors 31, 32 and the common ground. In the embodiment being considered, the condenser 43 preferably is approximately one-tenth the capacitance of the condenser 46 for reasons which will be explained more fully hereinafter. The synchronizing circuit also comprises a conventional reactance circuit 44 having an input circuit connected through a resistor 45 to the junction of the condenser 46 and the parallel circuit including the elements 41 and 42, and having an output circuit coupled to the frequency-control circuit of the generator 34. As is conventional in integrating circuits such as the circuit 40, the time constant thereof considered together with the transfer characteristics of the phase control loop circuit is sufficiently long to tend to average out the effects of random impulse noise on the control signal developed in such circuits for application through the reactance circuit 44 to control the frequency of the generator 34. It is conventional to employ time constants longer than several periods of the synchronizing signal.

The synchronizing system also comprises an auxiliary control system 23 including means responsive jointly to said oscillations and said synchronizing signals and substantially unresponsive to noise signals for producing different control effects for out-of-synchronism operation and in-synchronism operation. As previously mentioned, an auxiliary control system of this type is described and explained in detail in the inventor's copending application Serial No. 225,388. Briefly, the unit 23 includes an electron-discharge device such as a triode 50 having a control electrode coupled through one of a pair of terminals 22, 22 and a cathode coupled through a parallel circuit of a resistor 51 and a condenser 52 through another of the terminals 22, 22 to the output circuit of the video-frequency amplifier 15. The network including the resistor 51 and the condenser 52 is so proportioned as to maintain the tube 50 normally in a non-conductive condition and preferably has a time constant several times the period of line-frequency pulses. The anode of the tube 50 is coupled through a series circuit of a secondary winding of a transformer 53 and a load resistor 54 to a source of potential +B, the junction of this winding and the resistor 54 being capacitively coupled through a condenser 55 to the negative terminal of the B potential source for by-passing to ground signals at line frequency. The primary winding of the transformer 53 is coupled through a pair of terminals 56, 56 and a pair of terminals 57, 57 to an output circuit of the line-frequency amplifier 21. The connection in the amplifier 21 is made at a point therein, such as the anode of the amplifier tube, where there is developed in a conventional manner during each line-retrace interval a relatively high-amplitude short-duration impulse of positive polarity conventionally known as a line-retrace pulse. A pair of resistors 60 and 61 are connected in series between the junction of the secondary winding of the transformer 53 and the resistor 54 and one of a pair of output terminals 24, 24, the other of these terminals being connected to the negative terminal of the B potential source. A condenser 62 and a diode 63 are coupled in parallel between the junction of the resistors 60 and 61 and the other of the pair of terminals 24, 24 while a condenser 65 is connected across these terminals. The network including the condensers 55 and 62 and the resistor 60 is effectively a low-pass filter network for developing the aforementioned control signal as a potential across the condenser 55. The condensers 55 and 62 are so proportioned as to have low impedance to line-frequency pulses while having relatively high impedance to signals of less than 500 cycles. The resistors 54 and 60 preferably have resistances of the same order of magnitude. The condenser 55 is coupled through a pair of terminals 66, 66 and a resistor 67 to the control-electrode circuit of a tube 68. The resistor 61 and the condenser 65 are effectively coupled in series across the output circuit of the diode 63 and effectively comprise a low-pass filter network, specifically, a filter network which is proportioned to translate, for example, signals of a few cycles in order to cause a desired AGC control signal to be developed across the condenser 65.

The synchronizing system also comprises circuit means for utilizing said control effects for modifying the out-of-synchronism operation of said synchronizing means in such a way that the pull-in performance from out-of-synchronism operation is substantially improved. More specifically, this control means comprises a switching circuit 70 including a current-sensitive relay 74 having one terminal of the energizing coil thereof connected to the anode of a triode 68 and the other terminal connected through a resistor 75 to a source of potential +B. The relay 74 includes a movable contact 71 normally spring-loaded so as to be in contact with a stationary contact 72 and thus to be so positioned as to shunt the condenser 43 which, as has been stated, is part of the phase-control circuit. The cathode of the tube 68 is positively biased with respect to the control electrode of the tube 68 by being coupled to the junction of a pair of series-connected resistors 76 and 77 coupled across the B—potential source. The control electrode of the tube 68 is coupled to the negative terminal of the B— potential source through a condenser 78, the resistor 67 and the condenser 78 forming a biasing circuit for the control electrode. The tube 68 is normally so biased as to be nonconductive causing the energizing coil of the relay 74 not to be energized and the condenser 43 to be shunted by the movable contact 71.

*Explanation of operation of synchronizing system of Fig. 1*

Figure 2:
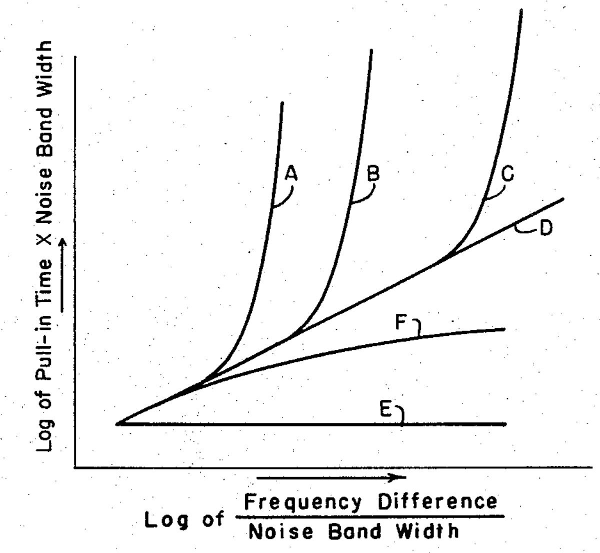
Fig. 2 is a graph useful in understanding the operation of the systems of Figs. 1, 3, and 5.

Before considering in detail the operation of the improved synchronizing system of Fig. 1, it will be helpful to discuss the limitations of conventional APC systems in terms of pull-in time T and the frequency difference $\Delta f$ between the local generator and the master generator, hereinafter briefly referred to as the frequency difference. There are certain parameters of a synchronizing system which appears to be fundamental and which substantially define the characteristics thereof. To a reasonably accurate degree, these characteristics may be defined in terms of the frequency difference $\Delta f$ in cycles, the time T in seconds required for the local generator to pull in, in other words, to reduce the frequency difference $\Delta f$ to zero and to become stable in operation, the accuracy with which the local generator remains in synchronism when once synchronized or, in other words, the tightness or stability of synchronism, and finally the effective noise pass band N of the synchronizing system when operating in a synchronized condition. The effective noise pass band N is related to the integration characteristics of the system and, particularly, to the effective time constant thereof. The pass band N defines the effective response of the system to noise signals when the system is in a synchronized condition. The range over which the static phase varies, in other words, the tightness of operation of the system when in synchronism, is substantially determined by the ratio of the direct-current gain to the alternating-current gain of the APC loop, this ratio determining the pull-in range of the system for a given noise pass band and static phase range. If the ratio exceeds a selected minimum value, the system is capable of operating as a conventional APC system and will pull in over a selected frequency range. The parameter of static phase range or stability may be considered as a constant in considering the synchronizing characteristics of the system relating to pull-in. Such synchronizing characteristics may be graphically represented by curves defined in terms of the pull-in time T, the frequency difference $\Delta f$, and the noise bandwidth N for predetermined loop gain ratios or static phase ranges. Fig. 2 represents a set of such response curves idealized for conventional and improved APC and AFC systems having a fixed noise pass band N. The coordinates for the curves of Fig. 2 are the logarithms of the terms TN and $$\frac{\Delta f}{N}$$

Curves A–D, inclusive, individually represent idealized response characteristics of conventional APC systems having different values of loop gain ratios, curve D representing the idealized response characteristic approached by a system having a relatively high loop gain ratio. These curves indicate that for a given loop gain ratio for a conventional APC system, there is a limit of pull-in range at which the pull-in time T required in order to bring the local generator into synchronism with a master generator becomes infinite. Curve D, representing the response characteristic for a highly efficient conventional APC system, is approximately a straight line having a slope which indicates substantially a square-law relationship between the coordinates defining this curve. It has been determined that, with a reasonable degree of accuracy, this relationship may be mathematically expressed as follows:

$$TN=k\left(\frac{\Delta f}{N}\right)^2 \qquad (1)$$

where $k$ is a constant having been experimentally determined to have a value of approximately 4 for efficient operation.

Equation 1 is useful in studying the synchronizing problem previously discussed herein. It has been stated that it is desirable to have for a television receiver a synchronizing system which has, as in a triggered synchronizing system, relatively wide pull-in range, that is, a system which can effect pull-in even when there is a relatively large frequency difference $\Delta f$ in the out-of-synchronous condition. It has also been stated that such system should have, as in an APC system, a high degree of noise immunity when in synchronism. It is preferred that these characteristics be obtained while retaining in the system a reasonably short pull-in time T. Equation 1 and curves A–D, inclusive, indicate that pull-in range, represented by maximum $\Delta f$ or pull-in time T may be varied by changing the noise pass band N of the synchronizing system.

The APC system of Fig. 1 makes use of the relations expressed in Equation 1 in providing acceptable pull-in ranges and noise pass bands under varied operating conditions. In the system of Fig. 1, synchronization may be effected from a relatively wide frequency difference, that is, over a wide pull-in range, at the expense of a relatively wide noise pass band for the system and, when the system is in synchronism, the pull-in range is narrowed to provide a narrower noise pass band N and, thus, higher stability of operation. In the system of Fig. 1 the parameters determining the noise pass band are varied to provide the two different conditions of operation by means of the aforementioned auxiliary control system 23 which is responsive to the condition of synchronization of the system.

In considering the operation of the synchronizing system of Fig. 1, initially it will be assumed that the condenser 43 is effectively shunted by the contacts 71 and 72 of the relay 74 as represented in Fig. 1 so that one terminal of the condenser 46 is directly connected to the negative terminal of the B potential supply. With such a circuit arrangement, the APC system including the tube 33, the integration circuit 40, the reactance circuit 44, and a portion of the line-frequency generator 34, operates in a conventional manner. This mode of operation will be briefly considered.

Line-frequency synchronizing pulses derived in the output circuit of the separator 19 are applied through the condenser 27 to the center of the winding 28 of the transformer 29. Sine-wave signals at approximately line frequency are developed in the generator 34 and applied to the winding 28, the sine-wave signal developed on one terminal of the winding 28 being 180° out of phase with the sine-wave signal developed on the other terminal thereof. Though the generator circuit being described utilizes sine waves, in accordance with well-known circuit arrangements, a saw-tooth wave signal may likewise be employed. The synchronizing pulses applied to the center tap and developed at both end terminals of the winding 28 are of the same phase. In a conventional manner, if the sine-wave signal developed in the generator 34 is in proper phase relation with the synchronizing pulses, equal and opposing currents flow in the tube 33 and no control signal is developed across the resistors 31 and 32. If the signals are not in proper phase relation, a potential will be developed across resistors 31 and 32, such potential being negative or positive with respect to the steady-state potential thereacross depending on the sensing of the misphasing. The control signal developed across the resistors 31, 32 effectively has a frequency representative of the beat frequency between the synchronizing pulses and the signal developed in the generator 34, the frequency of the developed signal being a measure of the degree of synchronization. The integration circuit 40 including, under the assumed operating condition, the condensers 41 and 46 and the resistor 42 is effective to develop from this signal a unidirectional control potential the sensing of which corresponds to the sense of phase difference of the signals. This unidirectional control potential is applied through the resistor 45 to the reactance circuit 44 effectively to control the reactance of the tuned circuit in the generator 34 thereby to cause the frequency of the signal developed in the generator 34 to be changed and the operation of the generator 34 is pulled into synchronism with the line-frequency synchronizing pulses.

The pull-in range which an APC system, including units such as the phase detector having the tube 33, the filter circuit 40, the reactance circuit 44, and a portion of the generator 34, may have is dependent upon the response characteristic of such system, in other words, on the noise pass band N of the phase control circuit. The relationship of the maximum frequency difference, pull-in time, and noise pass band for a given system is defined by Equation 1 above. As has previously been stated, if the noise pass band is narrow a relatively high stability of operation is obtained when the system is in synchronism, and it is desirable to design APC systems accordingly. However, such a narrow noise pass band may undesirably limit the pull-in range and pull-in time of the system for the out-of-synchronous condition. Thus, if a synchronizing system has a noise pass band of approximately 100 cycles and a pull-in range of approximately 300 cycles, in order to obtain reasonably satisfactory stability for in-synchronous operation the line-frequency synchronizing pulses and the frequency of the signal developed by the local generator 34 may not differ in frequency by appreciably more than 300 cycles if the pull-in range of the system is not to be exceeded rendering the automatic phasing of the system inoperable. If the pull-in range is exceeded, as for example, when the receiver is first energized or when switching from one station to another, manual adjustment of the APC system may be required to cause the generator 34 to operate in an in-synchronous condition. The manual adjustment may be a variation in the capacitance of the condenser 46 or in the resistance of the resistor 42, thus, effecting a change in the time constant of this circuit and in the noise bandwidth.

In accordance with the present invention, the synchronizing system 20 of Fig. 1 effects this change in the circuit 40 to extend the noise pass band N and increase the pull-in range of the APC system for an out-of-synchronous condition by automatically changing one of the parameters of the circuit 40. This change is effected by causing the condenser 43 to be placed in series with the condenser 46. In view of the ratio of approximately 10:1 between the capacitance of the condensers 43 and 46, for some systems the coupling of the condenser 43 in series with the condenser 46 effectively increases the pull-in range by a factor of 3 to 1. Though such a change in a parameter of the circuit 40 also increases the noise pass band, the increase in the noise pass band is not as detrimental in the out-of-synchronous condition as it would be in the in-synchronous condition.

In view of the above discussion it should be apparent that the generator 34 desirably generates a signal having a reference phase within one range of phase relation with respect to a reference phase of the synchronizing signal during in-synchronous operation of the generator. In other words, during synchronous operation of the generator 34, the signal developed thereby does not differ in frequency from that of the synchronizing signal by more than the conventional pull-in range of the APC system. However, the generator 34 does tend to develop signals which have frequencies exceeding such pull-in range and thus signals undesirably tending to have another range of such phase relations during the out-of-synchronous condition of operation of the generator 34. The manner in which the system 20 of Fig. 1 operates in order to extend the pull-in range of the synchronizing system and effect synchronization from the out-of-synchronous condition will now be considered.

The signal-developing arrangement 23 is effective to develop a control potential which represents the synchronizing condition of the generator 34. That is, the control potential developed in an output circuit of the unit 23 indicates whether or not the generator 34 is operating within the conventional pull-in range of the automatic-phase-control system or is beyond this pull-in range and, thus, out of synchronism. A related potential, as described in the aforementioned copending application, Serial No. 225,388, is utilized to control the magnitude of the AGC potential as applied through the terminals 24, 24 to the units 10, 12, and 13. The aforementioned control potential effects a change in the response characteristic of the network 40 and thus in the APC system by either causing the condenser 43 to be placed in series with the condenser 46 or by permitting the condenser 43 to be short circuited.

Considering now the operation of the unit 23, line-frequency synchronizing pulses are applied to the control-electrode circuit of the tube 50 through the terminals 22, 22 and line-frequency retrace pulses having a frequency dependent on the frequency of the generator 34 are applied from a circuit in the amplifier 21 through the terminals 57, 57, the terminals 56, 56, and the transformer 53 to the anode of the tube 50. As previously mentioned herein, the tube 50, due to the biasing effect of the network in the cathode circuit thereof, is normally nonconductive and is rendered conductive on effective coincidence of the positive pulses applied to the anode and the control electrode thereof. Under such coincidence conditions, the generator 34 is in synchronism and line-frequency signals are developed in the anode circuit of the tube 50 and substantially by-passed through the condenser 55 to the cathode circuit of the tube 50. These signals at line frequency cause substantially no potential change across the condenser 55. However, if only some of the pulses applied to the control-electrode circuit and the anode circuit of the tube 50 coincide due to misphasing of the two signals caused by the generator 34 being out of synchronism to some degree, a beat signal of low frequency is developed in the anode circuit of the tube 50. Because of the high impedance of the condenser 55 to such a low-frequency beat signal, a potential is developed thereacross representing the nonsynchronous operation of the generator 34.

The diode 63 may be considered to be a unidirectional resistor combining with the resistors 60 and 54 to form a voltage divider across the B potential supply. Under normal operating conditions, when no low-frequency beat-frequency signal is developed across the condenser 55, the anode of the diode 63 is at a negative or at ground potential. The diode 63 with the resistor 60 and the secondary winding of the transformer 53 also form one path for the beat-frequency signals. In the presence of such signals the diode 63 acting as a conventional peak detector limits the positive swing of such signals to, effectively, the potential of the cathode or ground and permits the negative swing of such potential to go below ground. Thus, the average potential for such signals as developed across the condenser 62 is approximately the mean between ground and the peak negative swing of the beat-frequency signals. This negative potential is filtered by means of the network 61, 65 to become a unidirectional AGC potential and applied through the terminals 24, 24 to the units 10, 12, and 13 to control the amplification of one or more of the stages of the latter units to maintain the signal input to the detector 14 and to the sound-signal reproducing unit 17 within a relatively narrow range for a wide range of received signal intensities.

The circuit including the resistors 54 and 60 and the diode 63 has been described as a voltage divider for unidirectional potentials. With the anode of the diode 63 at a negative potential when beat-frequency signals are being developed, the end terminals of the series circuit including the resistors 54 and 60 are, respectively, at potentials +B and less than −B. Thus, the junction of the resistors 54 and 60 is at some intermediate potential and, if as has been described previously, the resistors 54 and 60 are of the same order of magnitude, this junction is at a positive potential. As the beat-frequency signal is developed in the circuit of the tube 50, the average current flow through the triode 50 diminishes from that flowing therein when the synchronizing signals and the signals applied to the anode of the tube coincide, since this tube conducts less frequently to develop the beat-frequency signal. In view of the lower average current therethrough, the voltage drop across the resistor 54 is diminished and the positive potential at the junction of the resistors 54 and 60 tends to rise. The developing of the negative potential at the anode of the diode 63 tends to increase the current flow through the resistor 60 and thus further raise the positive potential at the junction of the resistors 54 and 60. Therefore, a more positive potential across the condenser 55 is an indication of the operation of the generator 34 in a nonsynchronous condition. This potential is translated through the terminals 66, 66, and filtered by the resistor 67 and the condenser 78 to become a unidirectional positive potential which is applied to the control electrode of the tube 68.

As described previously, the tube 68 is normally in a nonconductive condition due to the cathode being more positive than the control electrode thereof. When the positive control signal applied through the resistor 67 is of such magnitude as to cause the control electrode to exceed the positive bias on the cathode, anode current flows in the tube 68. The biasing level of the control electrode of the tube 68 is proportioned to be a threshold level between in-synchronous and out-of-synchronous operation of the system such that the tube 68 is not rendered conductive except when an out-of-synchronous condition exists.

When the tube 68 conducts anode current, the coil of the relay 74 is energized and the movable contact 71 is pulled out of contact with the stationary contact 72. The condenser 43 is placed in series with the condenser 46 and, as explained previously, the response characteristic of the automatic-phase-control system is changed to increase the pull-in range thereof.

Figure 3:
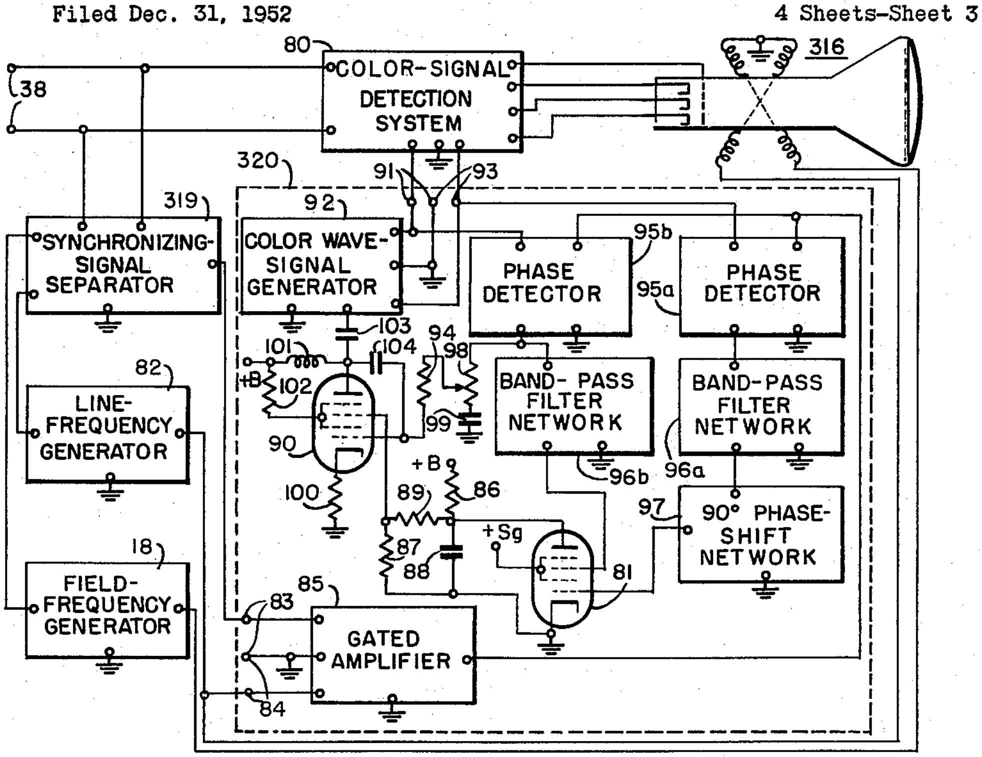
Fig. 3 represents a portion of a color-television receiver including a synchronizing system in accordance with the present invention.

*Description of portion of color-television receiver represented by Fig. 3*

In the synchronizng system of Fig. 1, the characteristics of an automatic-phase-control system were changed for in-synchronous and out-of-synchronous condition of the system in order to improve the operation thereof but the system remained an APC system having the different sets of operating characteristics under the different operating conditions. Such operating characteristics are limited to those represented by curves A–D, inclusive, for any given noise pass band of the system and limited to a similar set of curves for other noise pass bands. In a system such as described with reference to Fig. 1, the pull-in range is increased only at the expense of increasing the noise pass band of the system and thus at the expense of decreasing the stability of the system. It may be desirable to design an APC system with a high degree of stability, in other words, with a relatively narrow noise pass band and still utilize such an APC system in a synchronizing system having desirably wide pull-in range and preferably short pull-in time. The system of Fig. 3 is such that, although it is described herein with reference to a synchronizing system for a color-signal deriving system of a color-television receiver, it should be understood that the essentials of such a synchronizing system may be utilized wherever synchronizing of equipments is desired.

As previously stated herein, that portion of one type of color-television receiver which includes units for deriving the color signals from a modulated subcarrier wave signal requires that the operation of a color wave-signal generator therein be synchronized with the operation of a corresponding generator at the transmitter for developing the subcarrier wave signal. Fig. 3 represents a portion of a color-television receiver including such units for deriving the color signals and including a color wave-signal generator as part of a synchronizing system in accordance with the present invention. Corresponding units in Figs. 1 and 3 are designated by the same reference numerals while analogous units are indicated in the portion of the receiver of Fig. 3 by the same reference numerals as units in Fig. 1 but with the same reference numerals increased by 300. In considering the portion of the color-television receiver represented in Fig. 3, initially a general description and explanation of the operation thereof will be presented and then a more detailed description and explanation of operation of the improved synchronizing system included therein will be presented.

Fig. 3 represents a portion of a color-television receiver of a type more fully described in an article in "Electronics" for February 1952, pages 88–95, inclusive, and entitled "Principles of NTSC Compatible Color Television." Briefly, at a transmitter in such a system, color signals individually representative of primary colors, for example, green, red, and blue of a color image being televised, are developed and utilized to modulate different phase points of a subcarrier wave signal having a frequency within the video-frequency pass band. The different phase points may effectively be, for example, the 0, 90, 180 degree points of a cycle of the subcarrier wave signal. The modulated subcarrier wave signal and a conventional monochrome or brightness signal are combined and transmitted in a conventional manner. There is also transmitted, preferably during each horizontal blanking period, a pulse or burst portion of approximately 10 cycles of the unmodulated subcarrier wave signal.

At a color-television receiver in such system, the subcarrier wave signal is separated from the brightness or monochrome signal and the color-signal components occurring effectively as modulation components at the 0°, 90°, and 180° phase points of the subcarrier are individually derived therefrom and individually combined with the brightness signal for application to a color image-reproducing device to reproduce a color image of the televised scene. Such a color-television receiver is similar to a conventional monochrome receiver except for that portion included after the video-frequency amplifier and including the image-reproducing device. Fig. 3 represents the latter portion of such a color-television receiver.

The portion of the receiver represented by Fig. 3 is arranged to be coupled through the terminals 38, 38 to an output circuit of a video-frequency amplifier, such as the unit 15 of Fig. 1. A color-signal detection system 80 is coupled between the terminals 38, 38 and the intensity control circuit of a cathode-ray tube in an image-reproducing device 316. The color-signal detection system 80 is of a type more fully described in the aforementioned article in "Electronics." More specifically, such a unit usually comprises a signal-translating path for translating the brightness or monochrome signal, the output circuit of which is coupled to the control electrode of a cathode-ray tube. Such unit also conventionally includes a signal-translating system including at least two signal-translating channels for translating the subcarrier wave signal and deriving the color-signal components therefrom. Each of these channels may include, for example, an amplifier, a synchronous detector, and a low-pass filter network. The output circuits of each of the latter channels may be coupled together in a manner more fully described in the aforementioned article to provide a third signal-translating channel. The three signal-translating channels for the color-signal components are individually coupled to separate ones of three cathodes in the cathode-ray tube of the device 316. As described in the aforesaid article, in order to effect the derivation of the color-signal components from the different phase points of the subcarrier wave signal, there is included in the receiver a color wave-signal generator 92 which may be a conventional sine-wave oscillator having output circuits providing desired degrees of phase shift of a signal developed by the oscillator. Such generator is part of a synchronizing system 320 to be described more fully hereinafter. One output circuit of the generator 92 having circuit elements so proportioned as to effect no phase shift or delay of a signal translated therethrough is coupled through a pair of terminals 91, 91 to an input circuit of the detection system 80 and, specifically, to an input circuit of one of the synchronous detectors therein. Another output circuit of the generator 92 having circuit elements so proportioned as to effect a 90° shift or delay in phase of a signal translated therethrough is coupled through a pair of terminals 93, 93 to another input circuit of the detection system 80 and, specifically, to an input circuit of the other synchronous detector therein.

The image-reproducing device 316 includes a tube for developing color images from electrical signals applied to the control circuits thereof. A tube of such type is more fully described in an article entitled "General description of receivers for the dot-sequential color television system which employ direct-view tri-color kinescopes" in the RCA Review for June 1950 at pages 228–232, inclusive. Briefly, such a tube includes an image screen on which are arranged an orderly array of small, closely spaced dots in triangular groups, each group comprising dots individually responsive to signals representative, respectively, of primary colors, such as green, red, and blue, of an image. Interposed between the image screen and the electron gun in the tube is an apertured mask having a plurality of holes therein, individual ones of which are positioned in register with individual triangular groups of color dots on the image screen. The cathodes are so aligned with the dots through the apertures that only one electron beam strikes any one dot.

A pair of conventional line- and field-scanning coils in the device 316 are coupled, respectively, to output circuits of line-frequency and field-frequency generators 82 and 18, respectively, whose input circuits are coupled in a conventional manner through a synchronizing-signal separator 319 to the input terminals 38, 38. An output circuit of the separator 319 is coupled through a pair of terminals 83, 83 to an input circuit of a gated amplifier 85 in the unit 320 to supply the color burst signal thereto while the output circuit of the line-frequency generator 82 is coupled through another pair of terminals 84, 84 to another input circuit of the gated amplifier 85.

Briefly considering the operation of the portion of the receiver represented by Fig. 3, and neglecting for the moment the details of the synchronizing system 320, composite video-frequency signals including synchronizing-signal components, a brightness or monochrome component, and a modulated subcarrier wave signal are applied through the terminals 38, 38 to input circuits of the color-signal detection system 80 and the synchronizing-signal separator 319. In a manner more fully explained in the aforementioned article in "Electronics," the monochrome or brightness signal is translated through the unit 80 and applied to the control electrode of the cathode-ray tube in the device 316. Also in a manner more fully explained in that article, the color-signal components at, for example, the 0°, 90°, and 180° phase points of the subcarrier wave signal representing the green, blue, and red of the televised image are derived in the unit 80 and individually applied to different ones of the cathodes in the picture tube of the device 316. The synchronizing components are separated from each other and from the video-frequency information in the unit 319 and the line-frequency and field-frequency components are utilized in a conventional manner to control the operation of the generators 82 and 18, respectively. Signals developed in the output circuits of these generators are applied to the deflection windings in the device 316 to cause the electron beams emitted from the cathodes of the tube in the device 316 to trace a rectilinear pattern on the image screen of the tube. The intensities of the beams emitted from the cathodes are controlled in terms of the brightness signal applied to the control electrode of the tube and the color signals applied to the different ones of the cathodes thereof. The intensity control of the beams together with the beam paths from the electron guns through the different apertures in the apertured mask to the different ones of the phosphor dots for developing the different primary colors, cause the color image of the televised scene to be reproduced within the boundaries of the raster traced on the image screen.

The operation of the color-signal detection system 80 to develop the proper color-signal components for application to the different cathodes in the tube of the device 316 depends upon synchronism of operation of the color wave-signal generator 92 with the operation of a corresponding generator at the transmitter. In other words, the signals in quadrature phase and which are developed in the output circuits of the generator 92 and applied through the pairs of terminals 91, 91 and 93, 93 to different ones of the synchronous detectors in the unit 80 should be such as to heterodyne with the modulated subcarrier wave signal to derive the color signals from the subcarrier wave signal at the proper phase points thereof. If the operation of the generator 92 is not in synchronism with that of the corresponding generator at the transmitter, there will be a tendency to develop improper colors in the reproduced image due to a tendency to derive information from erroneous phase points of the subcarrier wave signal. Consequently, it is desirable that the operation of the generator 92 be maintained in synchronism with the operation of the corresponding generator at the transmitter. This synchronism is maintained by the synchronizing system 320 now to be described.

The synchronizing system 320 including the generator 92 is a particular embodiment of a frequency-difference detector system more fully considered in applicant's copending application Serial No. 328,918, filed December 31, 1952, and entitled "Frequency-Differences Detector System." The generator 92 comprises a unit for generating oscillations desirably in synchronism with said synchronizing signals but which may be undesirably out-of-synchronism. The system 320 comprises in series with one output circuit of the generator 92, specifically that output circuit coupled to the terminals 93, 93, a phase detector **95*a*, a filter network 96*a*, and a phase-shift network 97 for shifting the phase of the signals translated therethrough by 90°. There is in series with that output circuit of the generator 92 coupled to the pair of terminals 91, 91 a phase detector 95*b* and a filter network 96*b*. The phase detectors 95*a* and 95*b* may be of conventional construction and design for comparing the phases of signals applied thereto to develop a potential in the output circuits thereof which is representative of any undesired phase difference between the applied signals. The phase detectors 95*a* and 95*b* do not include in the output circuits thereof integration circuits having time constants long with respect to the period of the signals to be translated therethrough. The filter networks 96*a* and 96*b* are band-pass filter networks for translating signals having frequencies no higher than approximately one-half line frequency, since the interval between groups of synchronizing signals is the duration of a horizontal line, and having low-frequency cutoffs at approximately the upper limit of the noise pass band of the APC system. In other words, the spectrums of the noise pass band of the APC system and the pass bands of the filters 96*a* and 96*b* do not overlap to any substantial degree. The phase-shift network 97** may be a conventional differentiating circuit for effectively shifting the phase by 90° of signals translated therethrough and within a range of, for example, 100–7875 cycles.

The gated amplifier 85, as previously described, has different input circuits individually coupled to different pairs of the terminals 83, 83 and 84, 84 and has an output circuit coupled to an input circuit of each of the detectors **95*a* and 95*b*. The synchronizing system 320 also includes a signal-developing arrangement, specifically, a circuit including an electron tube 81 having the output circuit of the network 97 coupled to the inner control electrode thereof while the output circuit of the network 96*b* is coupled to the outer control electrode thereof. The positive terminal of a B potential supply is coupled through an anode load resistor 86 to the anode of the tube 81 while the negative terminal of this supply is coupled to the cathode of this tube. The positive terminal $+Sg$ of another potential source is coupled to a pair of screen electrodes bracketing the outer control electrode of the tube 81 while the negative terminal of the latter source is also connected to the cathode of the tube 81. The anode of the tube 81 is coupled to a control circuit coupled to the synchronizing circuit and responsive to the control signal developed in the anode of the tube 81 for causing the synchronizing circuit to have a different response characteristic for each of the synchronizing conditions of the generator 92. More specifically, the control circuit comprises a filter network which is essentially an integration network coupled to an outer control electrode of a tube 90 comprising a unit of a reactance circuit in the synchronizing circuit. The latter network has a time constant long with respect to line frequency and comprises a resistor 87 and a condenser 88 connected in parallel, a common terminal of the resistor-condenser network being coupled to the cathode of the tube 81**.

The other terminals of the network are coupled by a resistor 89, and the junction of the resistors 87 and 89 is coupled to the outer control electrode of the tube 90. The network including the elements 87, 88, and 89 is so proportioned as to by-pass low-frequency signal components developed on the anode of the tube 81, permitting substantially only the unidirectional signal components to be translated and may have a time constant of a substantial fraction of a second.

The inner control electrode of the tube 90 is coupled through a resistor 94 to a filter circuit comprising the series connection of a tapped resistor 98 and a condenser 99 across the output circuit of the phase detector **95*b*. The elements 98, 94, and 99 comprise a conventional filter network for a conventional APC system. The ratio of the alternating-current gain to the direct-current gain of the APC loop is the ratio of the impedance of the portion of the resistor 98 below the tap and the condenser 99 in series to the total resistance of the resistor 98. The cathode of the tube 90 is connected through a biasing resistor 100 to the common negative terminal of the aforesaid potential sources while the anode thereof is connected through a choke coil 101 to the positive terminal of the B potential source. A pair of screen electrodes bracketing the outer control electrode are connected through a current-limiting resistor 102 to the positive terminal of the B potential source. The anode of the tube 90 is also coupled through a coupling condenser 103 to the frequencey-determining circuit in the generator 92 and through a coupling condenser 104 to the control electrode of the tube 90**.

The detector **95*b*, the amplifier 85, the network including the elements 98, 99, and 94, and the reactance circuit including the tube 90 comprise synchronizing means for normally maintaining said oscillations in-synchronism and at a desired phase relationship with said synchronizing signals including means for confining the response of said synchronizing means to noise signals during in-synchronism operation to a narrow pass band of frequencies, whereby its pull-in performance from out-of-synchronism operation is unsatisfactory. More specifically, these units comprise a conventional APC system for controlling the frequency of the signal developed in the generator 92**.

*Explanation of operation of synchronizing system of Fig. 3*

Figure 4:
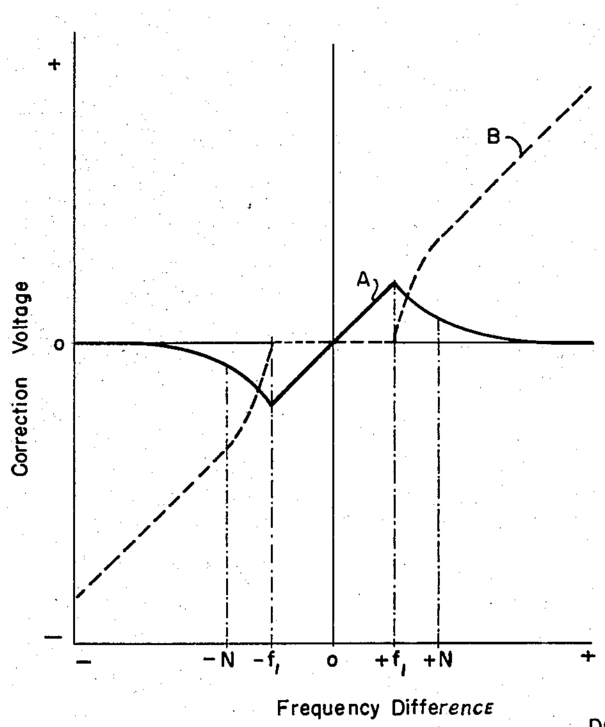
Fig. 4 is a graph useful in understanding the operation of the systems of Figs. 3 and 5.

Before considering the details of operation of the synchronizing system of Fig. 3 it will be helpful to consider Fig. 2 again. It has previously been indicated that curve D of Fig. 2 represents the response of an automatic-phase-control system having high loop gain for direct current and a substantially constant noise pass band, and that such response thereof, though preferable to less desirable responses such as represented by curves A–C, inclusive, is deficient in that for desired wide pull-in ranges the pull-in times may become excessively long or the noise pass band undesirably wide. Such is the case when the system is operated as an automatic-phase-control system for both the in-synchronous and out-of-synchronous conditions, and some understanding of the reason why an APC system with a fixed noise pass band has a limited pull-in range is apparent from an examination of Fig. 4. Fig. 4 graphically represents in an idealized form the control voltages developed in the synchronizing system of Fig. 3 to effect synchronization in response to a range of frequency differences between the signals being compared. Curve A of Fig. 4 represents the response of an automatic-phase-control system as a function of the frequency difference of the two signals to be synchronized. As the frequency difference is increased either positively or negatively, a point of maximum effective control voltage is reached at a frequency $f_1$ and beyond this point the magnitude of the control voltage decreases for increases in the frequency difference. Finally, for large frequency differences in excess of the limits $\pm N$ of the noise pass band of the APC system, the control voltage becomes so small as to be substantially zero, and the APC system ceases to function, requiring some auxiliary control such as manual adjustment to effect synchronization. As the frequency difference exceeds the value $\pm f_1$, the time required for pull-in increases as a power function of the frequency difference and the APC system operates inefficiently, if at all. It is apparent that a more efficient system is desired whenever the frequency $f_1$ is exceeded.

A system having a response characteristic such as indicated by curve B which is directly proportional to the frequency difference is more desirable. Since curve B represents the response characteristic of a modified type of automatic-frequency-control (AFC) system, it appears desirable that a synchronizing system have the characteristics of an APC system for frequency differences of the two signals less than approximately $\pm f_1$ and then have at least some of the characteristics of an AFC system having a response such as defined by curve B for greater frequency differences. For practical purposes, the points of maximum control voltage for an APC system at frequencies $\pm f_1$ represent the limits of frequency difference for efficient pull-in. Frequency differences substantially in excess of such limits indicate out-of-synchronism operation and a need for auxiliary equipment in achieving efficient operation. Thus, it appears desirable to utilize an APC system for in-synchronous operation and an AFC system for out-of-synchronous operation. The synchronizing system of Fig. 3 is based upon the conclusion just considered and includes an APC system for the in-synchronous condition and a modified AFC system for the out-of-synchronous condition.

A complete explanation of the operation of a frequency-detector system, of which the system 320 is a particular embodiment, is presented in applicant's aforementioned copending application Serial No. 328,918 and only a brief consideration of the details of the operation thereof is presented herein.

Initially in considering the operation of the synchronizing system 320, it is assumed that the color wave-signal generator is operating in synchronism, that is, at a frequency difference not in excess of $\pm f_1$ of Fig. 4 and thus within the normal pull-in range of the APC system including the gated amplifier 85, the phase detector **95*b*, the filter network including the resistor 98 and the condenser 99, and the reactance circuit including the tube 90. As explained previously herein, there is transmitted by the color-television transmitter during each line-blanking period a burst of approximately 10 cycles of the subcarrier wave signal having the proper frequency and phase to effect the desired control of the frequency and phasing of the signal developed in the generator 92. In order to utilize this color burst signal, the amplifier 85 is gated into a conducting condition by the line-frequency retrace signal normally developed in the output circuit of a generator, such as the unit 82. During a selected portion of the duration of the line-retrace pulse, the color burst signal is translated from an output circuit of the separator 319 through the terminals 83, 83 and the gated amplifier 85 to input circuits in both of the phase detectors 95*a* and 95*b*. The signal developed in the color wave-signal generator 92 and translated through that output circuit thereof coupled to the terminals 91, 91 is also applied to an input circuit of the phase detector 95*b*. If the color wave-signal generator is operating in synchronism with the corresponding generator at the transmitter, the signals applied to the phase detector 95*b* are substantially in quadrature and as is conventional in such phase detectors no output signal is developed in the output circuit thereof. If the generator 92 is not operating in synchronism but is operating within the pull-in range of the APC system, a beat-note signal will be developed in the detector 95*b* and an error signal will be developed in the output circuit thereof comprising a unidirectional component resulting from the beat-note signal. This signal is filtered by the resistor-condenser network 98, 99 and applied to the inner control electrode of the reactance tube 90. Under the assumed conditions, in other words, conventional APC operation, the transconductance of the tube 90** is modified by the potential applied to the inner control electrode thereof and causes a reactive effect to be developed in a conventional manner in the anode-cathode circuit thereof. Since a reactance tube is effectively a capacitance or inductance in parallel with the frequency-determining circuit of a generator coupled to such reactance tube, this reactive effect will be such as to change the frequency of the signal developed in the generator to cause the generator to operate in synchronism with the corresponding generator at the transmitter.

The APC system just described is conventional in operation and, therefore, has the limitations of such systems as represented by curve A of Fig. 4. For in-synchronism operation, such system operates in a reasonably efficient and desirable manner. For an out-of-synchronism condition, AFC is preferred for the reasons previously considered herein. By utilizing both AFC and APC systems, the pull-in range of the synchronizing system may be made adequately extensive without undesirably increasing the noise bandwidth of the system. In Fig. 3, the units **95*a*, 96*a*, 96*b*, 97, and the vacuum tube 81** with its circuit elements comprise additions to the above-discussed conventional APC system to provide an AFC system resulting in an improved synchronizing system in accordance with the present invention.

As explained above, the color burst signal is also applied by the gated amplifier 85 to an input circuit of the phase detector **95*a*. The signal developed by the generator 92 and translated through the terminals 93, 93, which signal is in quadrature phase with the signals translated through the terminals 91, 91, is applied to another input circuit of the detector 95*a*. Thus, if the generator 92 is operating in synchronism with the corresponding unit at the transmitter, the signals applied to the detector 95*b*, as described above, are in quadrature phase while the signals applied to the detector 95*a* are in phase. Deviations of the generator 92 from synchronism will cause relative phase displacements of the signals supplied to each of the detectors 95*a*, 95*b* but since these displacements will have the same magnitude in each detector, these detectors substantially derive output signals which are in quadrature. The filter networks 96*a* and 96*b* individually translate those fundamental beat-frequency signals having frequencies in excess of approximately the upper frequency of the noise pass band N and less than one-half line frequency. Preferably the lower cutoff frequencies of the filters 96*a* and 96*b* are in the vicinity of the frequency $f_1$ as indicated by Fig. 4. These beat-frequency signals are translated in quadrature phase. The phase-shift network 97 includes conventional circuits for shifting the phase of the signal translated therethrough. The translated signals differ in phase by substantially 90° causing the signals applied to the tube 81 to be in phase with each other if the phase error between the burst signal and the local signal is in one sense or 180° out of phase if the error is in the opposite sense. The tube 81 is effectively a signal-multiplying device for combining the signal applied from the unit 97 to the inner control electrode thereof and the signal applied to the outer control electrode thereof from the network 96*b*. These combined signals develop across the anode load resistor 86 an output potential representative of the frequency of the beat-frequency signals. If the applied signals are in phase, the output potential developed on the anode of the tube 81 will be such as to depress the normal anode potential while, if the output signals are antiphase, the normal anode potential increases. The resistors 86, 87, and 89 and the condenser 88 operate in a conventional manner to integrate the cross product output signal to develop a unidirectional potential representative thereof, the latter potential being applied to the outer control electrode of the tube 90 to control the transconductance thereof. Thus, if the generator 92 is operating at a frequency normally outside of the more effective portion of the pull-in range of the APC system, that is, if the frequency of the signal being developed by the generator 92 differs from the frequency of the synchronizing signal by more than approximately the frequency $\pm f_1$, as represented in Fig. 4, a control potential will be developed in the output circuit of the tube 81 in the APC system and applied to the outer control electrode of the tube 90 to change the transconductance of the tube 90 and thus the reactance characteristic of the reactance circuit to cause the synchranizing system rapidly to effect synchronization of the generator 92** when a conventional APC system would be unable to do so. The synchronization is effected by causing the system to respond as represented by curve B of Fig. 4 when the frequency difference is greater than $f_1$. It is apparent that the range of frequency differences over which the synchronizing system may operate may be greatly increased. This increase is effected with relatively little or no increase in the noise pass band of the system. The noise pass band of the APC portion of the system is, in fact, desirably relatively narrow. The AFC portion of the system also is relatively immune to noise.

The reason for the increased noise immunity of the AFC system including units such as the units **95*a*, 96*a*, 96*b*, 97, and the tube 81 is fully considered in the aforementioned copending application Serial No. 328,918. Briefly, in accordance with one form of this system, the system makes use of the fact that while any regular repetitive synchronizing signals continuously have both in-phase and quadrature components which are coherently related, random noise because of it random occurrence has in-phase and quadrature components which are incoherent and which vary with time. In other words, the noise signals at the in-phase and the quadrature positions will be independent of each other having no continuous phase relation to each other. Due to the incoherency of the noise components in the two signal-translating paths, each of which fluctuates about an average value of zero, their time average product will be zero and the beat note between such components over a period of time will tend to average to a value which approaches zero as the period of time is extended, while a similar averaging of the beat note between the coherent intelligence signals repetitively produces a result which has a specific unidirectional magnitude. To utilize these characteristics of the noise and intelligence signals the phase detectors 95*a* and 95*b* operate to derive related error signals from both the in-phase and quadrature phase components of the applied signals to develop coherent error signals having definite phase relationships. During the same period of operation of the units 95*a* and 95*b*, incoherent noise signals develop relatively independent effects in such error signals. The components representative of the intelligence information are effectively multiplied in the circuit including the tube 81 while, due to their incoherency, the components representative of the noise signals when multiplied are averaged out over a period of time. The period of time is at least in part determined by the constants of the circuit including the elements 87, 88, and 89**.

Figure 5:
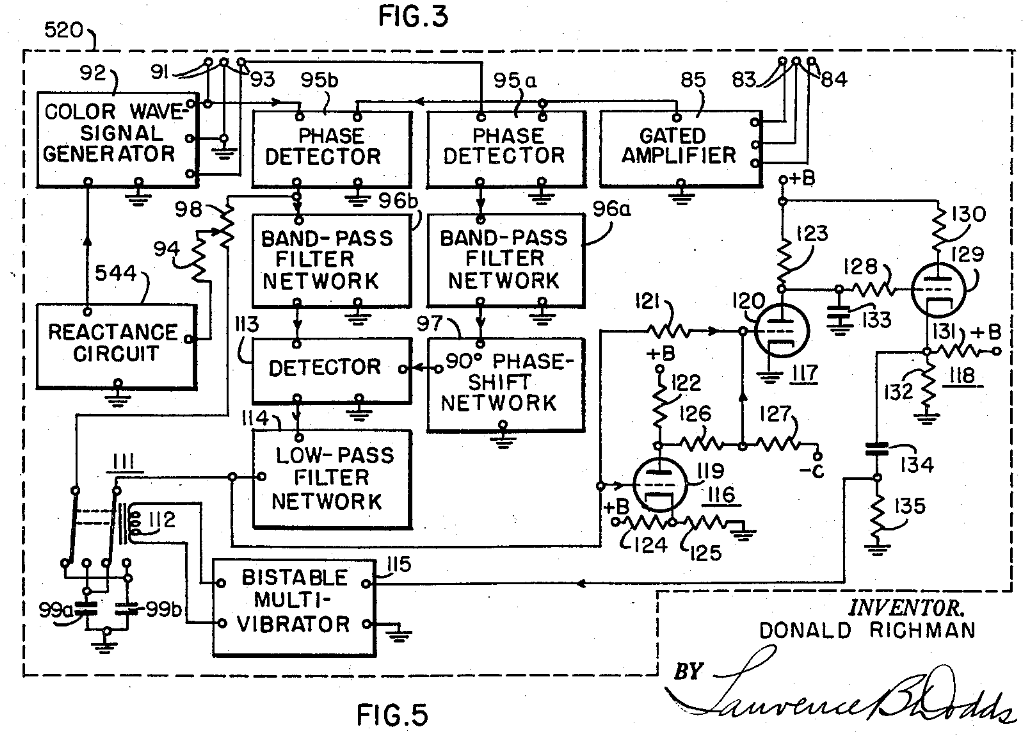
Fig. 5 represents a modified form of the system of Fig. 3.

*Description of Synchronizing systems of Fig. 5*

The synchronizing system of Fig. 3 has been described as one in which the pull-in range thereof may be widely extended without excessively increasing the noise pass band of the system by utilizing an AFC system effectively to extend the pull-in range of an APC system when the synchronizing system is in an out-of-synchronism condition.

Though the system of Fig. 3 represents one embodiment for utilizing the synchronizing information in the synchronizing signals in an efficient manner, such information may be utilized in other systems. It is possible after a reasonable time to utilize the information in the synchronizing signal to recognize an out-of-synchronism condition and then synchronization can be effected substantially immediately thereafter. The synchronizing system of Fig. 5 makes use of such information in such manner to effect substantially instantaneous synchronization after a predetermined minimum recognition time.

The synchronizing system represented by Fig. 5 is utilized for synchronizing the color-signal deriving system of a color-television receiver as described with reference to Fig. 3 and, therefore, includes components corresponding to units in Fig. 3. Additionally, some of the components in Fig. 5 correspond to components both in Fig. 3 and in Fig. 1. Consequently, such corresponding units are designated by the same reference numerals as initially utilized in either Fig. 1 or Fig. 3 while analogous units in Fig. 5 are indicated by the same reference numerals as initially utilized either in Fig. 1 or Fig. 3 with the same reference numerals increased by 500.

In the system of Fig. 5, the reactance circuit 544 is of a conventional type similar to the reactance circuit 44 of Fig. 1. The detector 113 corresponds to the circuit including the tube 81 in Fig. 3 and the low-pass filter network 114 corresponds to the integration circuit including the resistors 86, 87, and 89 and the condenser 88 in the system of Fig. 3. A control circuit coupled to the synchronizing circuit including the reactance circuit 544 and responsive to the control signal developed in the output circuit of the network 114 for causing the synchronizing circuit to have a different response characteristic for each of the synchronizing conditions is coupled to the output circuit of the network 114. More specifically, the control circuit comprises, in cascade, in the order mentioned, signal-translating networks 116 and 117, a cathode-follower circuit 118, and a bistable multivibrator circuit 115 having in the output circuit thereof a control winding 112 for a double-pole double-throw switch 111. The signal-translating networks 116 and 117 comprise, respectively, triode vacuum tubes 119 and 120, the control electrode of the tube 119 being directly coupled to the output circuit of the network 114 while that of the tube 120 is coupled to the latter output circuit through an isolating resistor 121. The anodes of the tubes 119 and 120 are coupled through load resistors 122 and 123, respectively, to a source of +B potential while the cathode of the tube 120 is coupled to ground. The cathode of the tube 119 is coupled to an intermediate point on a voltage divider comprising a pair of series-connected resistors 124 and 125 connected across the source of +B potential. The anode of the tube 119 is also coupled to the control electrode of the tube 120 through a resistor 126 while the latter control electrode is stabilized by means of a resistor 127 connected therefrom to a source of −C bias potential. The anode of the tube 120 is coupled through a resistor 128 to the control electrode of a tube 129 in the cathode-follower circuit 118. The anode of the tube 129 is connected to the source of +B potential through a resistor 130 while the cathode thereof is connected to a voltage divider comprising series-connected resistors 131 and 132 coupled across the source of +B potential. A condenser 133 is connected between the anode of the tube 120 and ground comprising with the resistor 123 an integration circuit. The cathode of the tube 129 is coupled through a differentiating circuit comprising series-connected condenser 134 and resistor 135 to the input circuit of the bistable multivibrator 115.

One of the movable contacts of the switch 111 is connected to the output circuit of the network 114 while the other thereof is connected to the resistor 98. A pair of condensers **99*a* and 99*b* of similar magnitude are connected to different pairs of the stationary contacts of the switch 111 so that either one of such condensers may be connected to either the network 114 or the junction of the resistors 94 and 98 by proper positioning of the movable contacts of the switch 111**.

The bistable multivibrator 115 may be of conventional construction, such construction being well known in the art.

*Operation of synchronizing system of Fig. 5*

Before considering the details of the operation of the system of Fig. 5 it may be helpful to consider the basis for the system. The improvement provided by the system of Fig. 5 is substantially an improvement in, specifically a diminishing or minimizing of, the pull-in time of the synchronizing system for very extensive pull-in ranges. A minimum pull-in time for a synchronizing system may be defined as that time required for the signal-developing arrangement thereof to recognize with an acceptable degree of reliability that the system is out of synchronism, in other words, that there is a frequency difference between the signals utilized to effect synchronism and to measure the magnitude and sense of the frequency difference. Once such frequency difference has been recognized and a corresponding control effect developed, it is possible substantially instantaneously to cause the local oscillator to be brought into synchronism with the master oscillator. Curve E of Fig. 2 represents the response of a system which has such a synchronizing characteristic. The displacement of curve E from the abscissa represents the minimum recognition time to obtain the aforementioned reasonable degree of reliability determined by factors of signal-to-noise ratio and system integration properties, as well as the closeness with which the frequency-difference detector approaches optimum output signal-to-noise ratio. The desired pull-in range may also be a factor. The synchronizing system of Fig. 5 has a response closely approaching that represented by curve E.

In general, except for the operation of the AFC portion thereof, the synchronizing system of Fig. 5 operates in a manner similar to that of the related synchronizing system of Fig. 3. In other words, the phase detector **95*b*, the integration circuit including the resistor 98 and one of the condensers 99*a* and 99*b* and the reactance circuit 544 function as an APC system to maintain the operation of the generator 92 in synchronism with the operation of a master oscillator at the transmitter. The phase detectors 95*a* and 95*b*, the band-pass filter networks 96*a* and 96*b*, the phase-shift network 97, the detector 113, and the low-pass filter network 114 operate in a manner similar to that of corresponding units in the system of Fig. 3 to develop a control potential in the output circuit of the network 114 when the generator 92** is out of synchronism by an amount exceeding the pull-in range of the APC system.

Preliminary to considering the details of operation of the improved synchronizing system of Fig. 5 it should be noted that, depending on the position of the movable contacts of the switch 111, one of the condensers **99*a* and 99*b*, for example the condenser 99*a*, may be coupled either to the output circuit of the network 114 or to the output circuit of the phase detector 95*b*. If the condenser 99*a* is coupled to the output circuit of the phase detector 95*b*, it is charged in proportion to the magnitude of the correction signal developed by the phase detector 95*b* while at the same time the other condenser 99*b*, being then coupled to the output circuit of the network 114, is charged in proportion to the magnitude of the control potential being developed by the AFC system. Referring to Fig. 4, it is apparent that as the frequency difference of the signals developed by the generator 92 and by the master generator at the transmitter exceeds $f_1$, the charge on the condenser in the APC system decreases and the control effect diminishes tending to prevent the APC system from effecting synchronism. During the same period of time, as the frequency difference increases, the condenser in the AFC circuit is charged in potential as represented by curve B of Fig. 4. The potential on the latter condenser increases as the frequency difference increases. Therefore, if the latter condenser should be disconnected from the AFC system and connected into the APC system, the potential thereacross would tend to effect synchronism instantaneously after being connected to the APC system. It is the purpose of the units 116, 117, 118, 115 and 111 to effect this switching of the condensers 99*a* and 99*b* to provide rapid synchronism of the generator 92 whenever the generator 92** is so far out of synchronism as to exceed the more effective portion of the pull-in range of the APC system.

In order so to control the switch 111, the potential developed across the condenser in the output circuit of the network 114 is applied to the control electrode of the tube 119 and through the resistor 121 to the control electrode of the tube 120. If this potential is negative with respect to ground, since the operating potentials of the tube 119 are such as normally to maintain this tube at cutoff, such negative potential applied to the control electrode thereof has no effect thereon. However, since the operating potentials of the tube 120 are such as normally to maintain this tube conductive, the negative potential may be of sufficient magnitude to cause the tube 120 to become nonconductive. When the tube 120 becomes nonconductive, the condenser 133 commences to charge through the resistor 123 and at some time after the initiation of such charging the tube 129 which is normally nonconductive becomes conductive due to the positive potential applied to the control electrode thereof. When the tube 129 becomes conductive, the cathode circuit thereof develops a pulse which is differentiated by the network including the condenser 134 and the resistor 135. The differentiated pulse is applied to the multivibrator 115 to cause the position of the movable contacts of the switch 111 to be changed thus connecting the condenser which previously had been connected in the output circuit of the network 114 to the output circuit of the phase detector **95*b*. As explained previously, the connection of such charged condenser to the output circuit of the detector 95*b* tends to effect rapid synchronism of the generator 92**.

If the output signal developed across the condenser in the output circuit of the network 114 is positive, the application of such positive signal to the tube 120 is ineffective to change the normally conductive condition thereof. However, such positive signal causes the tube 119 to become conductive, thereby causing the potential on the control electrode of the tube 120 to decrease to effect cutoff of the tube 120. The resistor 121 is an isolating resistor preventing the potential on the condenser in the output circuit of the network 114 from having a controlling effect during this period and effectively decoupling the control electrode and anode of the tube 119. After the tube 120 becomes nonconductive, the operation of the units 118, 115, and 111 is as previously described.

From the above explanation, it is apparent that the potential developed across the condenser in the output circuit of the network 114 is effective to determine the position of the movable contacts of the switch 111. Since this potential, as represented by curve B of Fig. 4, is a measure of the frequency difference between the signals developed in the generator 92 and in the master generator at the transmitter, it is required that it reach a level determined by the bias on either of the tubes 119 and 120 at which level the frequency difference is such as to make the switching desirable. The delay in effecting such switching caused by the charging time of the condenser 133 is desirable in order to provide time for the generator 92 to be synchronized after switching of the condensers **99*a* and 99*b*** has occurred. It is apparent that by causing a large control potential to be inserted in the APC system when, for example, the synchronizing system is so far out of synchronism as to exceed the more effective portion of the pull-in range of the phase-control system, synchronism may be rapidly effected. In this way the APC system may be designed to have the relatively narrow pull-in range resulting from a relatively narrow noise pass band thus providing a high degree of stability of operation when the system is in synchronism.

Figure 6:
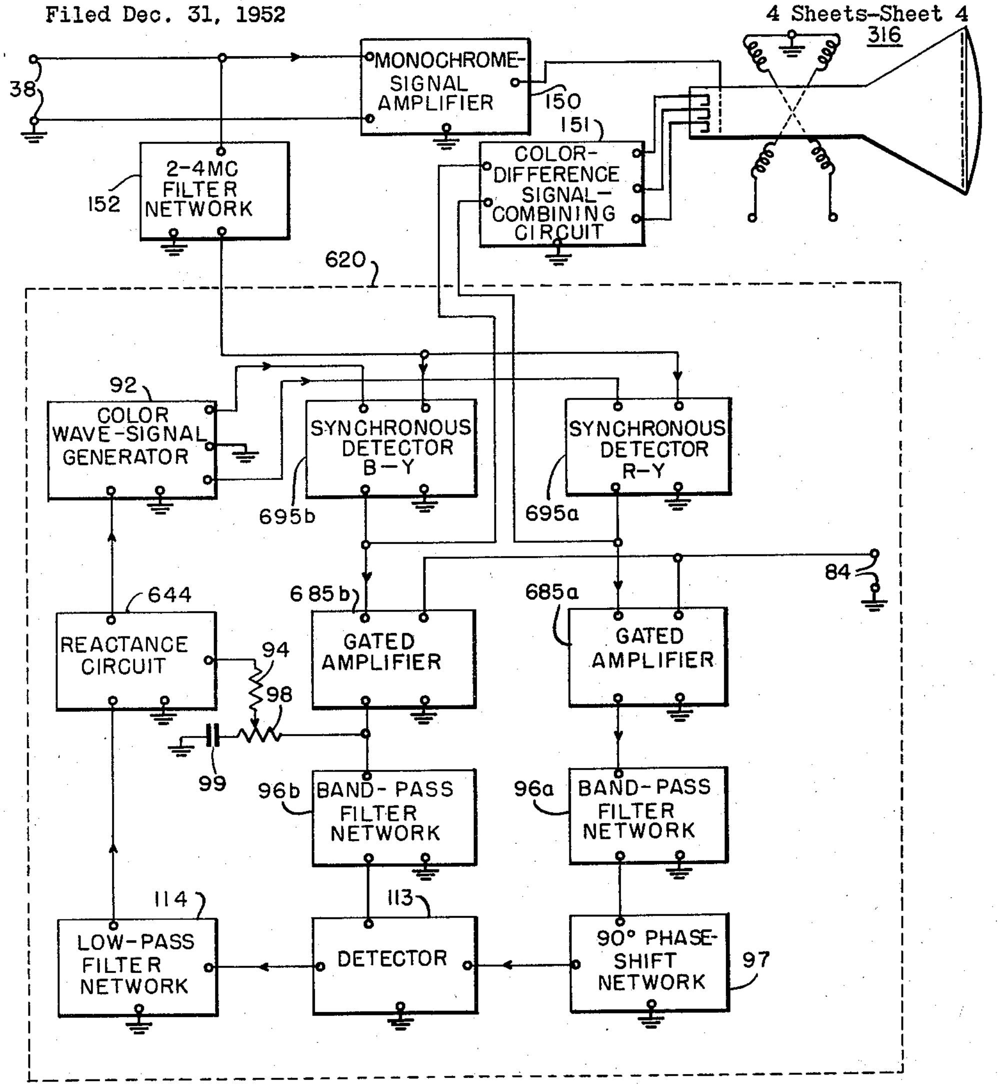
Fig. 6 represents still another modified form of the system of Fig. 3.

*Description and explanation of operation of portion of color-television receiver of Fig. 6*

In considering the portion of the color-television receiver represented by Fig. 3, it was explained that the color-difference signals representing the color of an image are derived in the color-signal detection system 80 of that figure. Since the synchronous detectors utilized to derive such color-difference signals are similar in both construction and operation to phase detectors, it may be desirable to utilize such conventional synchronous detectors both to derive color-difference signals and as phase detectors in a synchronizing system in accordance with the present invention. The portion of the television receiver of Fig. 6 is directed to an arrangement for so utilizing the synchronous detectors.

In view of the similarity of portions of the circuits represented by Figs. 3 and 6, corresponding units therein are designated by the same reference numerals while analogous units are indicated in the portion of the receiver of Fig. 6 by the same reference numerals as units in Fig. 3 but with a factor of 600 added to such reference numerals. Additionally, the detector 113 and the network 114 in Fig. 6 correspond to the similarly numbered units in Fig. 5.

The circuit of Fig. 6 differs principally from that of Fig. 3 in the utilization of a pair of synchronous detectors **695*a* and 695*b* in place of the phase detectors of Fig. 3 and in the utilization of gated amplifiers 685*a* and 685*b* coupled, respectively, between the output circuits of the detectors 695*a* and 695*b* and the input circuits of the filter networks 96*a* and 96*b*. An input circuit of each of the gated amplifiers 685*a* and 685*b* is coupled to the pair of terminals 84, 84 for application of a line-blanking pulse to each of these amplifiers. The color-signal detection system 80 of Fig. 3 is replaced by the pair of synchronous detectors 695*a* and 695*b*, a monochrome-signal amplifier 150, a 2–4 megacycle filter network 152, and a color-difference signal-combining circuit 151. The amplifier 150 is coupled between the pair of input terminals 38, 38 and the control electrode of the image-reproducing device 316. The unit 152 is coupled between the terminals 38, 38 and input circuits in the detectors 695*a* and 695*b*. The signal-combining circuit 151 has separate input circuits individually coupled to the output circuits of the detectors 695*a* and 695*b* and separate output circuits individually coupled to the three cathodes in the image-reproducing device 316. The combining circuit 151 is a matrixing circuit of a conventional type for combining the signals developed in the output circuits of the detectors 695*a* and 695*b*** to develop three color-difference signals representative of three primary colors of the image to be reproduced. Such a matrixing circuit is more fully described in the aforementioned "Electronics" article.

Except for the details of operation of the detectors **695*a* and 695*b* and of the gated amplifiers 685*a* and 685*b*, the portion of the color-television receiver represented by Fig. 6 operates in a manner similar to that of the portion of the receiver represented by Fig. 3 and, therefore, no complete description of the operation of the arrangement of Fig. 6 will be presented at this time. Briefly, a composite video-frequency signal including the monochrome signal Y derived in the output circuit of the second detector of the television receiver is applied through the terminals 38, 38 to the amplifier 150 and after amplification in the unit 150 to the control electrode of the apparatus 316. The modulated subcarrier wave signal which is a component of the composite video-frequency signal is applied through the network 152 to input circuits of the detectors 695*a* and 695*b*. During the picture portion of the composite video-frequency signal, that is, the portion between successive line-frequency pulses, the modulated subcarrier wave signal heterodynes in the units 695*a* and 695*b* with the signals developed in the generator 92 to derive, respectively, the $R-Y$ and $B-Y$ color-difference signals representing the red and blue, respectively, of the image. During the picture portion of the signal, the gated amplifiers 685*a* and 685*b* are in a nonconductive condition. The $R-Y$ and $B-Y$ signals are applied to input circuits of the combining circuit 151 wherein they are combined to develop $R-Y$, $B-Y$ and $G-Y$ color-difference signals for individual application to different ones of the cathodes of the apparatus 316. The manner in which the units 695*a* and 695*b* and in which the combining is effected in the unit 151 is more fully described in the aforesaid "Electronics" article. During the line-blanking period, no picture information is present in the composite video-frequency signal but the color burst signal is present. Therefore, the signals developed in the generator 92 heterodyne with the color burst signal in each of the detectors 695*a* and 695*b* to develop beat-frequency signals in the output circuits of these detectors. These beat-frequency signals, as previously discussed herein, represent the synchronizing condition of the generator 92. During the latter period, the line-retrace pulse is effective to cause the gated amplifiers 685*a* and 685*b* to become conductive thus permitting such beat-frequency signals to be applied to the filter networks 96*a* and 96*b*, respectively. The units 96*a*, 96*b*, 97, 113, 114, and 644 then operate as previously described herein to effect synchronization of the generator 92**. Thus, it is apparent that units normally available in a color-television receiver, such as previously described herein, may be employed as units of the improved synchronizing system in accordance with the present invention thereby minimizing the number of additional units or elements required to practice the present invention in such a color-television receiver.

There have been described herein three different embodiments of synchronizing systems each having effectively two modes of operation. Such systems, when operating within the normal or desired pull-in range of an automatic-phase-control system, operate in a substantially conventional manner. When the pull-in range of the automatic-phase-control system is exceeded, control signals are developed which are utilized to extend the pull-in ranges of the synchronizing systems while permitting desirable pull-in times and desirable signal-to-noise ratios for the noise pass band to be maintained. It should be understood that many of the different features of the systems described herein are interchangeable and that refinements thereof may be made within the teaching of the invention.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A highly noise-immune synchronizing system comprising: means for supplying a synchronizing signal liable to accompanying noise signals; a generator for generating oscillations desirably in synchronism with said synchronizing signal but which may be undesirably out-of-synchronism; synchronizing means for normally maintaining said oscillations in-synchronism and at a desired phase relation with said synchronizing signal including means for confining the response of said synchronizing means to noise signals during in-sychronism operation to a narrow pass band of frequencies, whereby its pull-in performance from out-of-synchronism operation is unsatisfactory; an auxiliary control system including means responsive jointly to said oscillations and said synchronizing signal and substantially unresponsive to noise signals for producing different control effects for out-of-synchronism operation and in-synchronism operation; and circuit means for utilizing said control effects for modifying the out-of-synchronism operation of said synchronizing means in such a way that the pull-in performance from out-of-synchronism operation is substantially improved.

2. A highly noise-immune synchronizing system for the color-signal deriving apparatus of a color-television receiver comprising: means for supplying repetitive color burst signals liable to accompanying noise signals; a color wave-signal generator for generating reference oscillations desirably in synchronism with said color burst signals but which may be undesirably out-of-synchronism; synchronizing means for normally maintaining said oscillations in-synchronism and at a desired phase relation with said burst signals including means for confining the response of said synchronizing means to noise signals during in-synchronism operation to a narrow pass band of frequencies, whereby its pull-in performance from out-of-synchronism operation is unsatisfactory; an auxiliary control system including means responsive jointly to said reference oscillations and burst signals and substantially unresponsive to noise signals for producing different control effects for out-of-synchronism operation and in-synchronism operation; and circuit means for utilizing said control effects for modifying the out-of-synchronism operation of said synchronizing means in such a way that the pull-in performance from out-of-synchronism operation is substantially improved.

3. A highly noise-immune synchronizing system for a television receiver comprising: means for supplying a synchronizing signal liable to accompanying noise signals; a generator for generating oscillations desirably in synchronism with said synchronizing signal but which may be undesirably out-of-synchronism; synchronizing means for normally maintaining said oscillations in-synchronism and at a desired phase relation with said synchronizing signal including means for confining the response of said synchronizing means to noise signals during in-synchronism operation to a narrow pass band of frequencies, whereby its pull-in performance from out-of-synchronism operation is unsatisfactory; an auxiliary control system including a phase detector responsive jointly to said oscillations and said synchronizing signal at a phase relation differing from said desired phase relation and substantially unresponsive to noise signals for producing different control effects for out-of-synchronism operation and in-synchronism operation; and circuit means for utilizing said control effects for modifying the out-of-synchronism operation of said synchronizing means in such a way that the pull-in performance from out-of-synchronism operation is substantially improved.

4. A highly noise-immune synchronizing system comprising: means for supplying a synchronizing signal liable to accompanying noise signals; a generator for generating oscillations desirably in synchronism with said synchronizing signal but which may be undesirably out-of-synchronism; an automatic-phase-control system which includes a phase detector responsive jointly to said oscillations and to said synchronizing signal and which produces a control effect on said generator tending to bring it into synchronism and at a desired phase relation with said synchronizing signal whenever the frequency difference between said oscillations and said synchronizing signal is within a useful pull-in range and to hold it in-synchronism, the system including means for confining the response of said automatic-phase-control system to noise signals during in-synchronism operation to a narrow pass band of frequencies, whereby its pull-in performance from out-of-synchronism operation is unsatisfactory; an auxiliary control system including means responsive jointly to said oscillations and said synchronizing signal and substantially unresponsive to noise signals for producing second control effects of different characteristics for out-of-synchronism operation and in-synchronism operation; and circuit means for utilizing said second control effects for modifying the out-of-synchronism operation of said automatic-phase-control system in such a way that the pull-in performance from out-of-synchronism operation is substantially improved.

5. A highly noise-immune synchronizing system for color-signal deriving apparatus of a color-television receiver comprising: means for supplying repetitive color burst signals liable to accompanying noise signals; a color wave-signal generator for generating reference oscillations desirably in synchronism with said color burst signals but which may be undesirably out-of-synchronism; an automatic-phase-control system which includes a phase detector responsive jointly to said reference oscillations and to said color burst signals and which produces a control effect on said generator tending to bring it into synchronism and at a desired phase relation with said color burst signals whenever the frequency difference between said reference oscillations and said color burst signals is within a useful pull-in range and to hold it in-synchronism, the system including means for confining the response of said automatic-phase-control system to noise signals during in-synchronism operation to a narrow pass band of frequencies, whereby its pull-in performance from out-of-synchronism operation is unsatisfactory; an auxiliary control system including means responsive jointly to said reference oscillations and burst signals and substantially unresponsive to noise signals for producing second control effects of different characteristics for out-of-synchronism operation and in-synchronism operation; and circuit means for utilizing said second control effects for modifying the out-of-synchronism operation of said automatic-phase-control system in such a way that the pull-in performance from out-of-synchronism operation is substantially improved.

6. A highly noise-immune synchronizing system comprising: means for supplying a synchronizing signal liable to accompanying noise signals; a generator for generating oscillations desirably in synchronism with said synchronizing signal but which may be undesirably out-of-synchronism; an automatic-phase-control system for normally maintaining said oscillations in-synchronism and at a desired phase relation with said synchronizing signal including a phase detector responsive jointly to said oscillations and said synchronizing signal for developing a beat-frequency signal representative of the phase difference therebetween, an integration circuit coupled to said phase detector for integrating said beat-frequency signal to develop a resultant signal, and means for applying said resultant signal to said generator to tend to maintain it in such synchronism, the integration circuit including time-constant circuit means for confining the response of said automatic-phase-control system to noise signals during in-synchronism operation to a narrow pass band of frequencies, whereby the pull-in performance of the automatic-phase-control system from out-of-synchronism operation is unsatisfactory; an auxiliary control system including means responsive jointly to said oscillations and said synchronizing signal and substantially unresponsive to noise signals for producing different control effects for out-of-synchronism operation and in-synchronism operation; and circuit means for utilizing said control effects for modifying the time constant of said time-constant circuit means in such a way that the pull-in performance of said automatic-phase-control system from out-of-synchronism operation is substantially improved.

7. A highly noise-immune synchronizing system for the color-signal deriving apparatus of a color-television receiver comprising: means for supplying repetitive color burst signals liable to accompanying noise signals; a color wave-signal generator for generating reference oscillations desirably in synchronism with said color burst signals but which may be undesirably out-of-synchronism; an automatic-phase-control system for normally maintaining said oscillations in-synchronism and at a desired phase relation with said color burst signals including a phase detector responsive jointly to said reference oscillations and said color burst signals for developing a beat-frequency signal representative of the phase difference therebetween, an integration circuit coupled to said phase detector for integrating said beat-frequency signal to develop a resultant signal, and means for applying said resultant signal to said generator to tend to maintain it in such synchronism, the integration circuit including time-constant circuit means for confining the response of said automatic-phase-control system to noise signals during in-synchronism operation to a narrow pass band of frequencies, whereby the pull-in performance of the automatic-phase-control system from out-of-synchronism operation is unsatisfactory; an auxiliary control system including means responsive jointly to said reference oscillations and said burst signals and substantially unresponsive to noise signals for producing different control effects of out-of-synchronism operation and in-synchronism operation; and circuit means for utilizing said control effects for modifying the time constant of said time-constant circuit means in such a way that the pull-in performance of said automatic-phase-control system from out-of-synchronism operation is substantially improved.

8. A highly noise-immune synchronizing system for a television receiver comprising: means for supplying a synchronizing signal liable to accompanying noise signals; a generator for generating oscillations desirably in synchronism with said synchronizing signal but which may be undesirably out-of-synchronism; an automatic-phase-control system which includes a first phase detector responsive jointly to said oscillations and to said synchronizing signal and which produces a control effect on said generator tending to bring it into synchronism and at a desired phase relation with said synchronizing signal whenever the frequency difference between said oscillations and said synchronizing signal is within a useful pull-in range and to hold it in-synchronism, the system including means for confining the response of said automatic-phase-control system to noise signals during in-synchronism operation to a narrow pass band of frequencies, whereby its pull-in performance from out-of-synchronism operation is unsatisfactory; an auxiliary control system including a second phase detector responsive jointly to said oscillations and said synchronizing signal at a phase relation differing from said desired phase relation and substantially unresponsive to noise signals for producing second control effects of different characteristics for out-of-synchronism operation and in-synchronism operation; and circuit means for utilizing said second control effects for modifying the out-of-synchronism operation of said automatic-phase-control system in such a way that the pull-in performance from out-of-synchronism operation is substantially improved.

9. A highly noise-immune synchronizing system for a television receiver comprising: means for supplying a synchronizing signal liable to accompanying noise signals; a generator for generating oscillations desirably in synchronism with said synchronizing signal but which may be undesirably out-of-synchronism; an automatic-phase-control system which includes a first phase detector responsive jointly to said oscillations and to said synchronizing signal and which produces a control effect on said generator tending to bring it into synchronism and at a desired phase relation with said synchronizing signal whenever the frequency difference between said oscillations and said synchronizing signal is within a useful pull-in range and to hold it in-synchronism, the system including means for confining the response of said automatic-phase-control system to noise signals during in-synchronism operation to a narrow pass band of frequencies, whereby its pull-in performance from out-of-synchronism operation is unsatisfactory; an auxiliary control system including a second phase detector responsive jointly to said oscillations and said synchronizing signal at a phase relation differing from said desired phase relation and including filtering and detection means for effectively rejecting noise for producing noise-free second control effects of different characteristics for out-of-synchronism operation and in-synchronism operation; and circuit means for utilizing said second control effects for modifying the out-of-synchronism operation of said automatic-phase-control system in such a way that the pull-in performance from out-of-synchronism operation is substantially improved.

10. A highly noise-immune synchronizing system for a television receiver comprising: means for supplying a synchronizing signal liable to accompanying noise signals; a generator for generating oscillations desirably in synchronism with said synchronizing signal but which may be undesirably out-of-synchronism; an automatic phase-control system which includes a first phase detector responsive jointly to said oscillations and to said synchronizing signal and which produces a control effect on said generator tending to bring it into synchronism and at a desired phase relation with said synchronizing signal whenever the frequency difference between said oscillations and said synchronizing signal is within a useful pull-in range and to hold it in-synchronism, the system including means for confining the response of said automatic-phase-control system to noise signals during in-synchronism operation to a narrow pass band of frequencies, whereby its pull-in performance from out-of-synchronism operation is unsatisfactory; an auxiliary control system including a second phase detector responsive jointly to said oscillations and said synchronizing signal at a phase relation which is in quadrature with said desired phase relation and substantially unresponsive to noise signals for producing second control effects of different characteristics for out-of-synchronism operation and in-synchronism operation; and circuit means for utilizing said second control effects for modifying the out-of-synchronism operation of said automatic-phase-control system in such a way that the pull-in performance from out-of-synchronism operation is substantially improved.

11. A highly noise-immune synchronizing system for a television receiver comprising: means for supplying a synchronizing signal liable to accompanying noise signals; a generator for generating oscillations desirably in synchronism with said synchronizing signal but which may be undesirably out-of-synchronism; an automatic-phase-control system which includes a first phase detector responsive jointly to said oscillations and to said synchronizing signal and which produces a control effect on said generator tending to bring it into synchronism and at a desired phase relation with said synchronizing signal whenever the frequency difference between said oscillations and said synchronizing signal is within a useful pull-in range and to hold it in-synchronism, the system including means for confining the response of said automatic-phase-control system to noise signals during in-synchronism operation to a narrow pass band of frequencies, whereby its pull-in performance from out-of-synchronism operation is unsatisfactory; an auxiliary control system including a second phase detector responsive jointly to said oscillations and said synchronizing signal at a phase relation differing from said desired phase relation and substantially unresponsive to noise signals for producing second control effects of different characteristics for out-of-synchronism operation and in-synchronism operation; means for rendering the auxiliary control system inactive during in-synchronism operation; and circuit means for utilizing said second control effects for modifying the out-of-synchronism operation of said automatic-phase-control system in such a way that the pull-in performance from out-of-synchronism operation is substantially improved.

12. A highly noise-immune synchronizing system for a television receiver comprising: means for supplying a synchronizing signal liable to accompanying noise signals; a generator for generating oscillations desirably in synchronism with said synchronizing signal but which may be undesirably out-of-synchronism; synchronizing means for normally maintaining said oscillations in-synchronism and at a desired phase relation with said synchronizing signal including means for confining the response of said synchronizing means to noise signals during in-synchronism operation to a narrow pass band of frequencies, whereby its pull-in performance from out-of-synchronism operation is unsatisfactory; a pair of phase detectors at least one of which is independent of said synchronizing means; an auxiliary control system including said phase detectors for producing different control effects for out-of-synchronism operation and in-synchronism operation; each phase detector being responsive jointly to said oscillations and said synchronizing signal with the phase relation between the two detectors differing to such extent that noise signals in the outputs of the two phase detectors are largely inchoherent and have a time average product near zero; the auxiliary control system including means for developing said control effects jointly from the outputs of said phase detectors; and circuit means for utilizing said control effects for modifying the out-of-synchronism operation of said synchronizing means in such a way that the pull-in performance from out-of-synchronism operation is substantially improved.

13. A highly noise-immune synchronizing system for color-signal deriving apparatus of a color-television receiver comprising: means for supplying repetitive color burst signals liable to accompanying noise signals; a color wave-signal generator for generating reference oscillations desirably in synchronism with said color burst signals but which may be undesirably out-of-synchronism; synchronizing means for normally maintaining said reference oscillations in-synchronism and at a desired phase relation with said color burst signals including means for confining the response of said synchronizing means to noise signals during in-synchronism operation to a narrow pass band of frequencies, whereby its pull-in performance from out-of-synchronism operation is unsatisfactory; a pair of phase detectors at least one of which is independent of said synchronizing means; an auxiliary control system including said phase detectors for producing different control effects for out-of-synchronism operation and in-synchronism operation, each phase detector being responsive jointly to said reference oscillations and said burst signals with the phase relation between the two detectors differing to such extent that noise signals in the outputs of the two phase detectors are largely incoherent and have a time average product near zero; the auxiliary control system including means for developing said control effects jointly from the outputs of said phase detectors; and circuit means for utilizing said control effects for modifying the out-of-synchronism operation of said synchronizing means in such a way that the pull-in performance from out-of-synchronism operation is substantially improved.

14. A highly noise-immune synchronizing system for a television receiver comprising: a circuit for supplying a synchronizing signal liable to accompanying noise signals; a generator for generating oscillations desirably in synchronism with said synchronizing signal but which may be undesirably out-of-synchronism; an automatic-phase-control system which includes a first phase detector responsive jointly to said oscillations and to said synchronizing signal and which produces a control effect on said generator tending to bring said oscillations into synchronism and at a desired phase relation with said synchronizing signal whenever the frequency difference between said oscillations and said synchronizing signal is within a useful pull-in range and to hold it in-synchronism, the system including means for confining the response of said automatic-phase-control system to noise signals during in-synchronism operation to a narrow pass band of frequencies, whereby its pull-in performance from out-of-synchronism operation is unsatisfactory; an auxiliary control system including said first phase detector and a second phase detector for producing second control effects of different characteristics for out-of-synchronism operation and in-synchronism operation, the second phase detector being responsive jointly to said oscillations and said synchronizing signal at a phase relation differing from that in said first phase detector to such extent that noise signals in the outputs of the two phase detectors are largely incoherent and have a time average product near zero, the auxiliary control system including means for developing said control effects jointly from the outputs of said phase detectors; and circuit means for utilizing said control effects for modifying the out-of-synchronism operation of said automatic-phase-control system in such a way that the pull-in performance from out-of-synchronism operation is substantially improved.

15. A highly noise-immune synchronizing system for color-signal deriving apparatus of a color-television receiver comprising: a circuit for supplying repetitive color burst signals liable to accompanying noise signals; a color wave-signal generator for generating reference oscillations desirably in synchronism with said color burst signals but which may be undesirably out-of-synchronism; an automatic-phase-control system which includes a first phase detector responsive jointly to said reference oscillations and to said burst signals and which produces a control effect on said generator tending to bring said oscillations into synchronism and at a desired plase relation with said burst signals whenever the frequency difference between said oscillations and said burst signals is within a useful pull-in range and to hold it in-synchronism, the system including means for confining the response of said automatic-phase-control system to noise signals during in-synchronism operation to a narrow pass band of frequencies, whereby its pull-in performance from out-of-synchronism operation is unsatisfactory; an auxiliary control system including said first phase detector and a second phase detector for producing second control effects of different characteristics for out-of-synchronism operation and in-synchronism operation, the second phase detector being responsive jointly to said reference oscillations and said burst signals at a phase relation differing from that in said first phase detector to such extent that noise signals in the outputs of the two phase detectors are largely incoherent and have a time average product near zero, the auxiliary control system including means for developing said control effects jointly from the outputs of said phase detectors; and circuit means for utilizing said control effects for modifying the out-of-synchronism operation of said automatic-phase-control system in such a way that the pull-in performance from out-of-synchronism operation is substantially improved.

16. A highly noise-immune synchronizing system for the color-signal deriving apparatus of a color-television receiver comprising: means for supplying repetitive color burst signals liable to accompanying noise signals; a color wave-signal generator for generating reference oscillations desirably in synchronism with said color burst signals but which may be undesirably out-of-synchronism; an automatic-phase-control system for normally maintaining said oscillations in-synchronism and at a desired phase relation with said color burst signals including a phase detector responsive jointly to said reference oscillations and said color burst signals for developing a beat-frequency signal representative of the phase difference therebetween, an integration circuit coupled to said phase detector for integrating said beat-frequency signal to develop a resultant signal, and means for applying said resultant signal to said generator to tend to maintain it in such synchronism, the integration circuit including time-constant circuit means for confining the response of said automatic-phase-control system to noise signals during in-synchronism operation to a narrow pass band of frequencies whereby the pull-in performance of the automatic-phase-control system from out-of-synchronism operation is unsatisfactory; an auxiliary control system including said phase detector and a second phase detector for producing second control effects of different characteristics for out-of-synchronism operation and in-synchronism operation, the second phase detector being responsive jointly to said reference oscillations and said burst signals at a phase relation differing from that in said first phase detector to such extent that noise signals in the outputs of the two phase detectors are largely incoherent and have a time average product near zero, said auxiliary control system including means for developing said control effects jointly from the outputs of said phase detectors; and circuit means for utilizing said control effects for modifying the out-of-synchronism operation of said automatic-phase-control system in such a way that the pull-in performance from out-of-synchronism operation is substantially improved.

17. A highly noise-immune synchronizing system for a television receiver comprising: a circuit for supplying a synchronizing signal liable to accompanying noise signals; a generator for generating oscillations in synchronism with said synchronizing signal but which may be undesirably out-of-synchronism; an automatic-phase-control system which includes a first phase detector responsive jointly to said oscillations and to said synchronizing signal and which produces a control effect on said generator tending to bring said oscillations into synchronism and at a desired phase relation with said synchronizing signal whenever the frequency difference between said oscillations and said synchronizing signal is within a useful pull-in range and to hold it in-synchronism, the system including means for confining the response of said automatic-phase-control system to noise signals during in-synchronism operation to a narrow pass band of frequencies, whereby its pull-in performance from out-of-synchronism operation is unsatisfactory; an auxiliary control system including said first phase detector and a second phase detector for producing second control effects of different characteristics for out-of-synchronism operation and in-synchronism operation, the second phase detector being responsive jointly to said oscillations and said synchronizing signal at a phase relation differing from that in said first phase detector by about 90° whereby noise components in the outputs of the two phase detectors are largely incoherent and have a time average product near zero, the auxiliary control system including means for developing said control effects jointly from the outputs of said phase detectors; and circuit means for utilizing said control effects for modifying the out-of-synchronism operaiton of said automatic-phase-control system in such a way that the pull-in performance from out-of-synchronism operation is substantially improved.

18. A highly noise-immune synchronizing system for a television receiver comprising: a circuit for supplying a synchronizing signal liable to accompanying noise signals; a generator for generating oscillations desirably in synchronism with said synchronizing signal but which may be undesirably out-of-synchronism; an automatic-phase-control system which includes a first phase detector responsive jointly to said oscillations and to said synchronizing signal and which produces a control effect on said generator tending to bring said oscillations into synchronism and at a desired phase relation with said synchronizing signal whenever the frequency difference between said oscillations and said synchronizing signal is within a useful pull-in range and to hold it in-synchronism, the system including means for confining the response of said automatic-phase-control system to noise signals during in-synchronism operation to a narrow pass band of frequencies, whereby its pull-in performance from out-of-synchronism operation is unsatisfactory; an auxiliary control system including said first phase detector and a second phase detector for producing unidirectional control effects of different characteristics for out-of-synchronism operation and in-synchronism operation, the second phase detector being responsive jointly to said oscillations and said synchronizing signal at a phase relation differing from that in said first phase detector to such extent that noise signals in the outputs of the two phase detectors are largely incoherent and have a time average product near zero, said auxiliary control system including means for shifting the phase of the output of at least one of said phase detectors, and means for developing said unidirectional control effects jointly from the outputs of said phase detectors; and circuit means for utilizing said control effects for modifying the out-of-synchronism operation of said automatic-phase-control system in such a way that the pull-in performance from out-of-synchronism operation is substantially improved.

19. A highly noise-immune synchronizing system for a television receiver comprising: a circuit for supplying a synchronizing signal liable to accompanying noise signals; a generator for generating oscillations desirably in synchronism with said synchronizing signal but which may be undesirably out-of-synchronism; an automatic-phase-control system which includes a first phase detector responsive jointly to said oscillations and to said synchronizing signal and which produces a control effect on said generator tending to bring said oscillations into synchronism and at a desired phase relation with said synchronizing signal whenever the frequency difference between said oscillations and said synchronizing signal is within a useful pull-in range and to hold it in-synchronism, the system including means for confining the response of said automatic-phase-control system to noise signals during in-synchronism operation to a narrow pass band of frequencies, whereby its pull-in performance from out-of-synchronism operation is unsatisfactory; an auxiliary control system including said first phase detector and a second phase detector for producing unidirectional control effects of different characteristics for out-of-synchronism operation and in-synchronism operation, the second phase detector being responsive jointly to said oscillations and said synchronizing signal at a phase relation differing from that in said first phase detector to such extent that noise signals in the outputs of the two phase detectors are largely incoherent and have a time average product near zero, said auxiliary control system including band-pass filters for suppressing from the output of said detectors all frequencies within approximately said narrow pass band of frequencies, means for shifting the phase of the output of at least one of said phase detectors, and means for developing said unidirectional control effects jointly from the outputs of said filters and phase-shift means; and circuit means for utilizing said control effects for modifying the out-of-synchronism operation of said automatic-phase-control system in such a way that the pull-in performance from out-of-synchronism operation is substantially improved.

20. A highly noise-immune synchronizing system for a television receiver comprising: a circuit for supplying a synchronizing signal liable to accompanying noise signals; a generator for generating oscillations desirably in synchronism with said synchronizing signal but which may be undesirably out-of-synchronism; an automatic-phase-control system which includes a first phase detector responsive jointly to said oscillations and to said synchronizing signal and which produces a control effect on said generator tending to bring said oscillations into synchronism and at a desired phase relation with said synchronizing signal whenever the frequency difference between said oscillations and said synchronizing signal is within a useful pull-in range and to hold it in-synchronism, the system including means for confining the response of said automatic-phase-control system to noise signals during in-synchronism operation to a narrow pass band of frequencies, whereby its pull-in performance from out-of-synchronism operation is unsatisfactory; an auxiliary control system including said first phase detector and a second phase detector for producing unidirectional control effects of different characteristics for out-of-synchronism operation and in-synchronism operation, the second phase detector being responsive jointly to said oscillations and said synchronizing signal at a phase relation differing from that in said first phase detector to such extent that noise signals in the outputs of the two phase detectors are largely incoherent and have a time average product near zero, said auxiliary control system including band-pass filters for suppressing from the output of said detectors all frequencies within approximately said narrow pass band of frequencies and those above a predetermined frequency above said pass band, means for shifting the phase of the output of at least one of said phase detectors, and means for developing said unidirectional control effects jointly from the outputs of said filters and phase-shift means; and circuit means for utilizing said control effects for modifying the out-of-synchronism operation of said automatic-phase-control system in such a way that the pull-in performance from out-of-synchronism operation is substantially improved.

References Cited in the file of this patent

UNITED STATES PATENTS

| | | |
|---|---|---|
| 2,410,817 | Ginzton | Nov. 12, 1946 |
| 2,419,527 | Bartelink | Apr. 29, 1947 |
| 2,425,922 | Crosby | Aug. 19, 1947 |
| 2,460,112 | Wright et al. | Jan. 12, 1949 |
| 2,491,804 | Fleming et al. | Dec. 20, 1949 |
| 2,492,090 | Bass | Dec. 20, 1949 |
| 2,504,293 | Beard | Apr. 18, 1950 |
| 2,551,308 | Adler | May 1, 1951 |
| 2,551,785 | Bedford | May 8, 1951 |
| 2,567,286 | Hugenholtz | Sept. 11, 1951 |
| 2,568,412 | Robinson | Sept. 18, 1951 |
| 2,594,380 | Barton et al. | Apr. 29, 1952 |
| 2,610,297 | Leed | Sept. 9, 1952 |

OTHER REFERENCES

Clark, Automatic Frequency Control of Television Sweep Circuits, Proceedings of the I. R. E., May 1947, page 487.